US012331662B2

(12) United States Patent
Mizukami et al.

(10) Patent No.: US 12,331,662 B2
(45) Date of Patent: Jun. 17, 2025

(54) STRUCTURE OF COOLING TURBINE VANE SHROUD AND MANUFACTURING METHOD THEREOF

(71) Applicant: MITSUBISHI HEAVY INDUSTRIES, LTD., Tokyo (JP)

(72) Inventors: Satoshi Mizukami, Houston, TX (US); David Allen Flodman, Houston, TX (US); Satoshi Hada, Houston, TX (US); Yasumasa Kunisada, Tokyo (JP); Saki Matsuo, Tokyo (JP); Ryo Tanaka, Tokyo (JP); Takuro Kameda, Tokyo (JP); Yusuke Akada, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 153 days.

(21) Appl. No.: 17/988,518

(22) Filed: Nov. 16, 2022

(65) Prior Publication Data

US 2024/0159158 A1 May 16, 2024

(51) Int. Cl.
*F01D 9/06* (2006.01)

(52) U.S. Cl.
CPC .......... *F01D 9/065* (2013.01); *F05D 2240/11* (2013.01); *F05D 2260/201* (2013.01)

(58) Field of Classification Search
CPC ...... F01D 9/065; F01D 5/187; F05D 2240/11; F05D 2260/201; F05D 2240/81
See application file for complete search history.

(56) References Cited

U.S. PATENT DOCUMENTS 4,303,371 A * 12/1981 Eckert .................... F01D 11/08 415/178
5,609,466 A * 3/1997 North ...................... F01D 5/187 415/115

(Continued)

FOREIGN PATENT DOCUMENTS

DE 102005024696 A1 1/2006
JP 2013-142396 A 7/2013
JP 2021-148089 A 9/2021

OTHER PUBLICATIONS

International Search Report dated Dec. 26, 2023, issued in counterpart Application No. PCT/JP2023/037093. (8 pages).

(Continued)

*Primary Examiner* — Courtney D Heinle
*Assistant Examiner* — Andrew Thanh Bui
(74) *Attorney, Agent, or Firm* — WHDA, LLP

(57) ABSTRACT

A shroud of a vane of a turbine is provided. The shroud includes a shroud main body comprising a first wall having a gas-passage face facing a hot gas passage of the turbine and a cooling face facing opposite to the hot gas passage, a shroud edge disposed on a circumference of the shroud main body to surround the shroud main body, the shroud edge comprising a shroud edge passage therein, and an impingement box disposed to face the cooling face of the first wall so as to be spaced apart from the cooling face of the first wall. The impingement box comprises a cooling air inlet to introduce a cooling air from the shroud edge passage into an inside of the impingement box, and an impingement air hole configured to jet the introduced cooling air to the cooling face of the first wall to cool the cooling face of the first wall.

16 Claims, 29 Drawing Sheets

(56) References Cited

U.S. PATENT DOCUMENTS

| | | | | |
|---|---|---|---|---|
| 6,126,389 | A * | 10/2000 | Burdgick | F01D 25/12 415/173.1 |
| 9,638,047 | B1 | 5/2017 | Jones | |
| 2007/0009349 | A1 * | 1/2007 | Ward, Jr. | F01D 11/08 415/115 |
| 2013/0084160 | A1 * | 4/2013 | Fleming | F01D 11/24 415/1 |
| 2013/0177396 | A1 | 7/2013 | Winn | |
| 2018/0202301 | A1 * | 7/2018 | Otomo | F01D 9/065 |
| 2019/0032499 | A1 * | 1/2019 | Matsuo | F01D 25/12 |
| 2021/0246796 | A1 | 8/2021 | Galoul et al. | |
| 2023/0340882 | A1 | 10/2023 | Matsuo et al. | |

OTHER PUBLICATIONS

Written Opinion dated Dec. 26, 2023, issued in counterpart Application No. PCT/JP2023/037093, with English Translation. (6 pages).

* cited by examiner

STRUCTURE OF COOLING TURBINE VANE SHROUD AND MANUFACTURING METHOD THEREOF

TECHNICAL FIELD

The present disclosure relates to a structure of cooling a turbine vane shroud, and also relates to a manufacturing method of a structure of cooling a turbine vane shroud.

BACKGROUND

A stator vane of a gas turbine and a rotor blade of the gas turbine are exposed to high temperature combustion gas. Thus, the stator vane and the rotor blade are cooled by cooling air. For example, U.S. Pat. No. 9,638,047 (US '047) describes an impingement plate which sequentially impingement cools a stator vane. FIG. 5 of US '047 describes that a series of separate impingement cavities 12, 13, 21 are sequentially impingement cooled.

SUMMARY

Recently, gas turbine inlet temperature is increased, and thus, it is desirable to further facilitate cooling of the first stage stator vane. One of approaches to address the above is to supply cooling air with higher pressure and lower temperature (compared to conventional technology) to the first stage stator vane. According to the study by inventors, in a case when the cooling air with higher pressure and lower temperature is used for cooling the first stage stator vane, even after the cooling air is used for cooling an airfoil or a shroud edge, there is a possibility that the cooling air may be re-used for cooling other elements or components of the first stage stator vane. However, in the conventional technology, efficiency of use of the cooling air is limited.

It is desirable to provide a cooling method or cooling structure of a stator vane of a gas turbine which enables better efficiency of use of cooling air.

According to a first aspect of the present disclosure, there is provided a shroud of a vane of a turbine comprising:

- a shroud main body comprising a first wall having a gas-passage face facing a hot gas passage of the turbine and a cooling face facing opposite to the hot gas passage;
- a shroud edge disposed on a circumference of the shroud main body to surround the shroud main body, the shroud edge comprising a shroud edge passage therein; and
- an impingement box disposed to face the cooling face of the first wall so as to be spaced apart from the cooling face of the first wall.

The impingement box comprises a cooling air inlet to introduce a cooling air from the shroud edge passage into an inside of the impingement box, and an impingement air hole configured to jet the introduced cooling air to the cooling face of the first wall to cool the cooling face of the first wall.

With the above-described feature, because the shroud includes the impingement box, it is possible to provide a shroud of a vane of a turbine which allows for readily manufacturing and assembling thereof while improving cooling efficiency by suppressing leakage of the cooling air.

According to a second aspect of the present disclosure, there is provided a method of manufacturing a shroud of a vane of a turbine, the shroud comprising:

- a shroud main body comprising a first wall having a gas-passage face facing a hot gas passage of the turbine and a cooling face facing opposite to the hot gas passage, and a shroud edge disposed on a circumference of the shroud main body to surround the shroud main body, the shroud edge comprising a shroud edge passage therein.

The method comprises:

- disposing an impingement box to face the cooling face of the first wall so as to be spaced apart from the cooling face of the first wall;
- wherein the impingement box comprises a cooling air inlet to introduce a cooling air from the shroud edge passage into an inside of the impingement box, and an impingement air hole configured to jet the introduced cooling air to the cooling face of the first wall to cool the cooling face of the first wall.

With the above-described feature, because the impingement box is disposed to the shroud, it is possible to provide a shroud of a vane of a turbine which allows for readily manufacturing and assembling thereof while improving cooling efficiency by suppressing leakage of the cooling air.

BRIEF DESCRIPTION OF THE DRAWINGS

The advantages of the disclosure will become apparent in the following description taken in conjunction with the following drawings.

DESCRIPTION OF THE PREFERRED EMBODIMENTS

Figure 1:
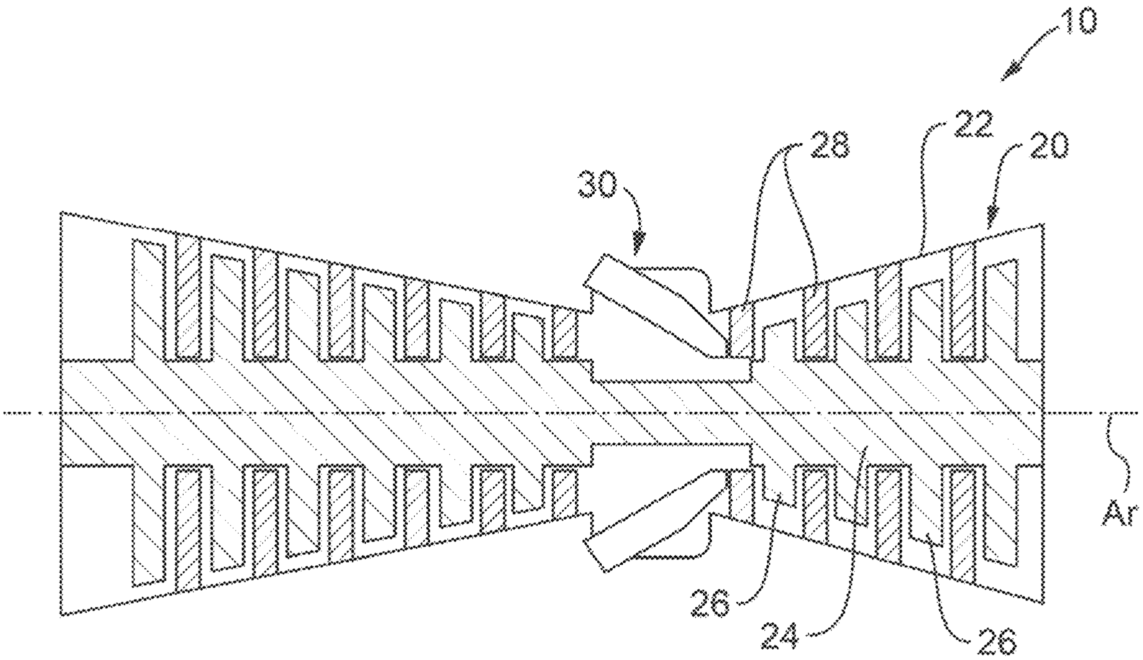
FIG. 1 is a schematic sectional view of a gas turbine in an embodiment according to the present disclosure.

A preferred embodiment of the present disclosure will be described in detail below with reference to the drawings. FIG. 1 is a schematic sectional view of a gas turbine in an embodiment according to the present disclosure. As shown in FIG. 1, a gas turbine 10 of this embodiment includes a turbine 20 driven by combustion gas generated by a combustor 30. The turbine 20 has a rotor shaft 24, a turbine rotor 26 that rotates around an axis Ar, a turbine casing 22 that covers the turbine rotor 26, and a plurality of stator vane stages 28.

Figure 2:
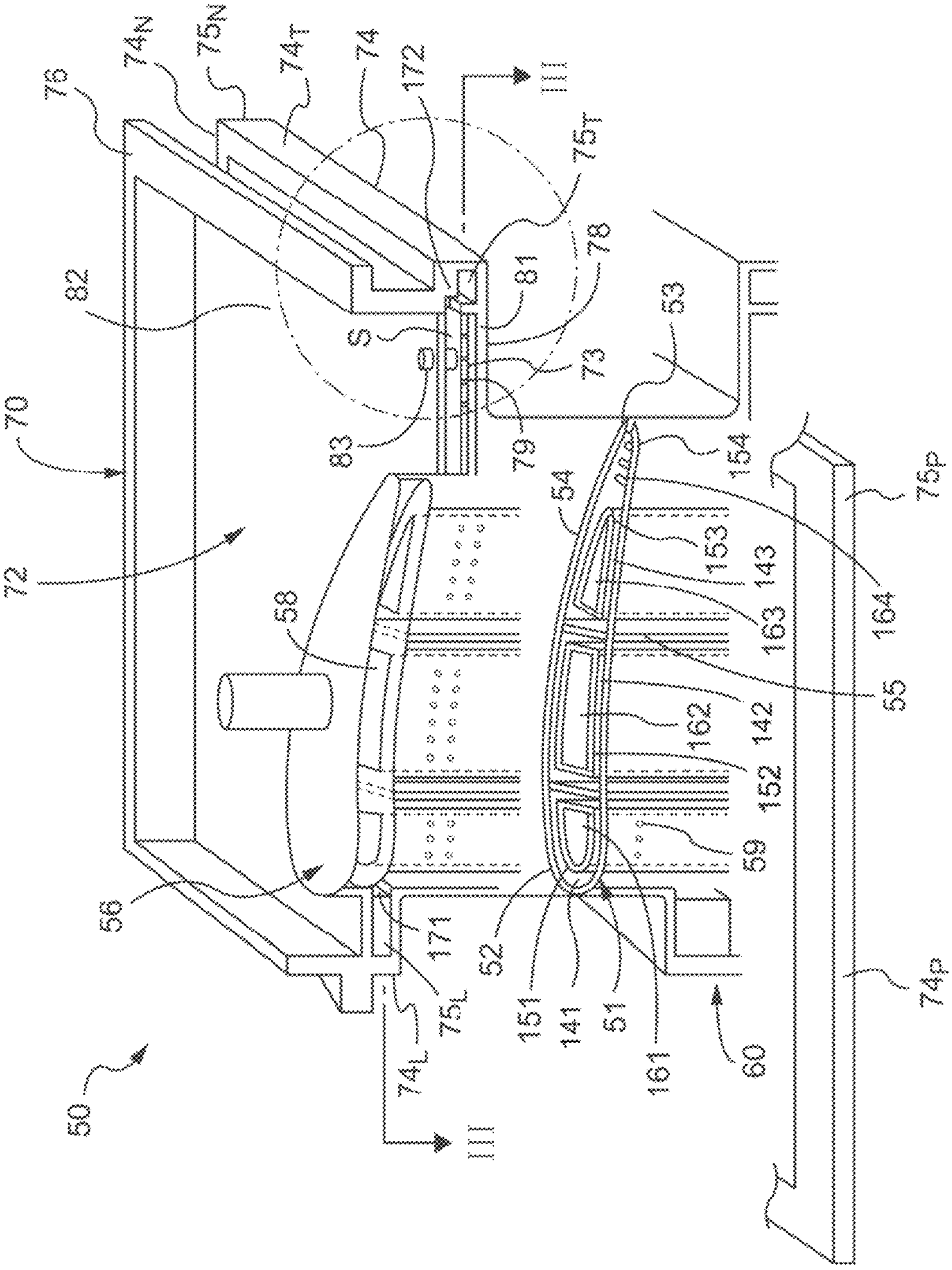
FIG. 2 is a perspective view of a stator vane in a first embodiment.
Figure 3:
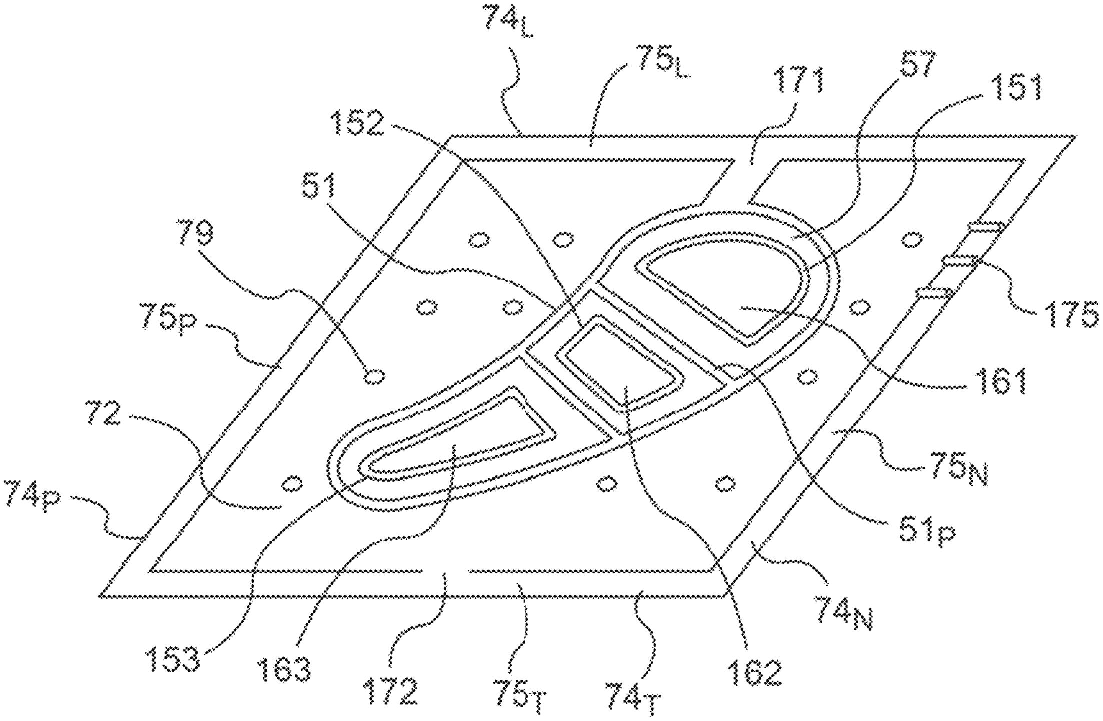
FIG. 3 is a sectional view taken along the line III-III of FIG. 2.
Figure 4:
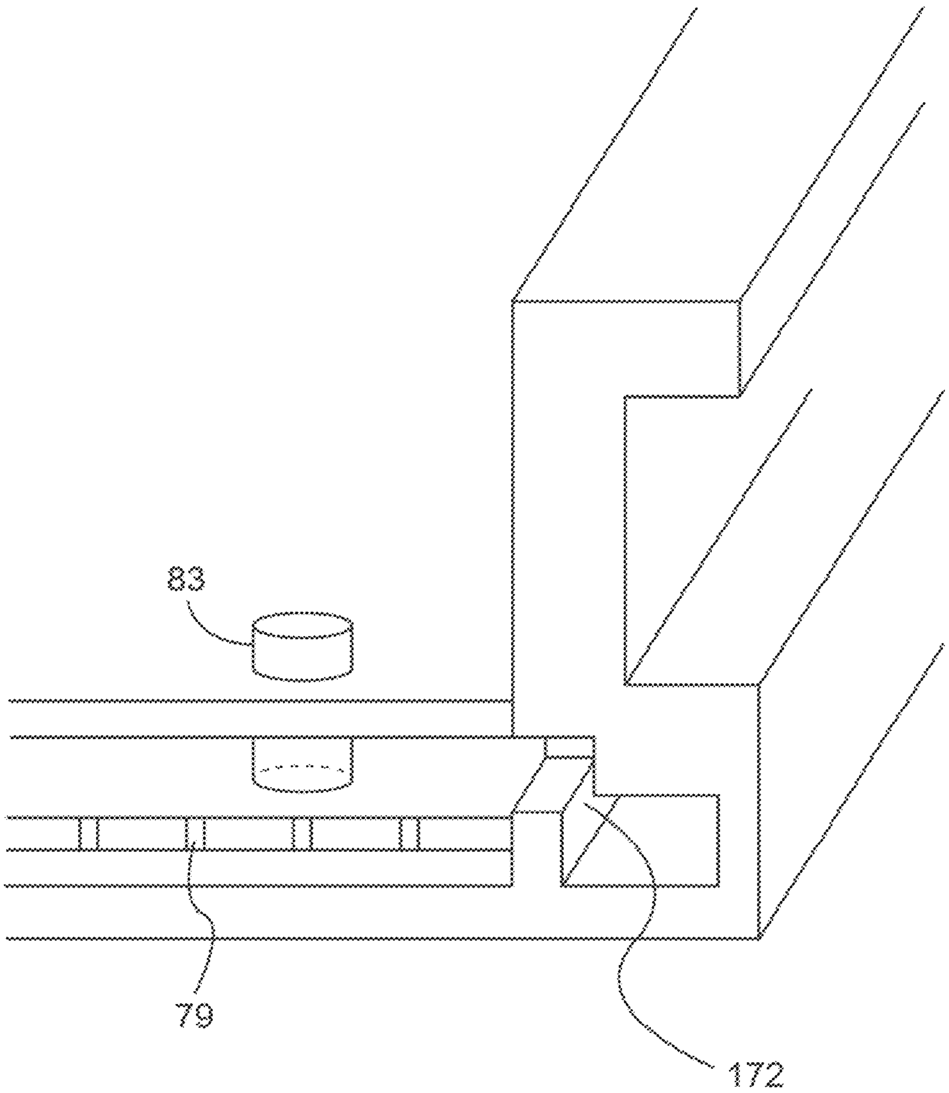
FIG. 4 is a partial enlargement view of the stator vane.

FIG. 2 schematically illustrates a stator vane of a gas turbine according to an embodiment of the present disclosure. FIG. 2 is a perspective view of a stator vane in a first embodiment. FIG. 3 is a sectional view taken along the line III-III of FIG. 2. FIG. 4 is a partial enlargement view of the stator vane. As shown in FIG. 2, a stator vane 50 includes a vane body (airfoil) 51 extending in a radial direction of a gas turbine, an inner shroud 60 disposed on the radially inner side of the vane body 51, and an outer shroud 70 disposed on the radially outer side of the vane body 51. The vane body 51 is disposed in a combustion gas flow passage (hot gas passage) through which the combustion gas passes. Generally, an annular combustion gas flow passage is defined by the inner shroud 60 on the radially inner side thereof and by the outer shroud 70 on the radially outer side thereof. The inner shroud 60 and the outer shroud 70 are plate-shaped members which define a part of the combustion gas flow passage.

As shown in FIG. 2, an end of the vane body 51 on the upstream side has a leading edge 52, and an end of the vane body 51 on the downstream side has a trailing edge 53. Among surfaces of the vane body 51, a convex surface is a suction-side surface 54 (negative pressure surface) and a concave surface is a pressure-side surface 55 (positive pressure surface). For the convenience purpose, in the following descriptions, the pressure side (positive pressure-surface side) of the vane body 51 and the suction side (negative pressure-surface side) of the vane body 51 will be referred to as a pressure side and a suction side, respectively.

The inner shroud 60 and the outer shroud 70 have basically the same structure. Therefore, the outer shroud 70 will be described primarily below.

As shown in FIG. 2 and FIG. 3, the outer shroud 70 is a plate-shaped shroud member which comprises a shroud main body 72, a shroud edge 74 disposed on a circumference of the shroud main body 72, and a peripheral wall 76 that extends along the shroud edge 74 and protrudes from the shroud main body 72 toward the radially outer side of the gas turbine.

The outer shroud 70 has a leading end surface being an end surface on the upstream side, a trailing end surface being an end surface on the downstream side, a pressure-side end surface being an end surface on the pressure side, a suction-side end surface being an end surface on the suction side. The outer shroud 70 has a gas path surface 78 facing the radially inner side and facing the hot gas passage. The leading end surface and the trailing end surface are substantially parallel to each other. The pressure-side end surface and the suction-side end surface are substantially parallel to each other. Thus, when seen from the radial direction, the outer shroud 70 has a substantially parallelogram shape as shown in FIG. 3.

The shroud edge 74 is a brim or rim shaped structure projecting from the shroud main body 72. The shroud edge 74 includes a leading-side shroud edge $74_L$ disposed on the upstream side of the outer shroud 70, a trailing-side shroud edge $74_T$ disposed on the downstream side of the outer shroud 70, a suction-side shroud edge $74_N$ disposed on the suction side of the outer shroud 70, and a pressure-side shroud edge $74_P$ disposed on the pressure side of the outer shroud 70. For example, as shown by FIG. 3, the leading-side shroud edge $74_L$, the trailing-side shroud edge $74_T$, the suction-side shroud edge $74_N$, and the pressure-side shroud edge $74_P$ are disposed on a circumference of the shroud main body 72 to entirely surround the shroud main body 72.

The leading-side shroud edge $74_L$ includes a leading-side shroud edge passage $75_L$ inside thereof. The trailing-side shroud edge $74_T$ includes a trailing-side shroud edge passage $75_T$ inside thereof. The suction-side shroud edge $74_N$ includes a suction-side shroud edge passage $75_N$ inside thereof. The pressure-side shroud edge $74_P$ includes a pressure-side shroud edge passage $75_P$ inside thereof.

In this embodiment, the leading-side shroud edge passage $75_L$ is communicated with the suction-side shroud edge passage $75_N$ at one end thereof and communicated with the pressure-side shroud edge passage $75_P$ at the other end thereof. The trailing-side shroud edge passage $75_T$ is communicated with the suction-side shroud edge passage $75_N$ at one end thereof and communicated with the pressure-side shroud edge passage $75_P$ at the other end thereof. As shown by FIG. 2, FIG. 3 and FIG. 4, the leading-side shroud edge passage $75_L$ has a shroud edge passage inlet 171. The trailing-side shroud edge passage $75_T$ has a shroud edge passage outlet 172. Part of cooling air which flows into the leading-side shroud edge passage $75_L$ through the shroud edge passage inlet 171 flows through the suction-side shroud edge passage $75_N$ and the pressure-side shroud edge passage $75_P$, then flows through the trailing-side shroud edge passage $75_T$, and then, flows out from the shroud edge passage outlet 172. As shown by FIG. 3, the shroud edge passages $75_L$, $75_T$, $75_P$, $75_N$ include turbulators 175. The turbulator 175 may be a rib disposed on an inner surface of the shroud edge passages. To enhance cooling of the shroud edge, the turbulator 175 may be disposed on a bottom surface of the passage which defines a radially inner side of the passage. Here, the bottom surface of the passage may be extended substantially parallel to the radially inner wall 81. Also, the turbulator 175 may be disposed on a side surface of the passage which defines an outer lateral side of the passage.

In the present embodiment, the shroud edge passage inlet 171 is provided to the leading-side shroud edge passage $75_L$ and the shroud edge passage outlet 172 is provided to the trailing-side shroud edge passage $75_T$. However, the structure of the stator vane is not limited to this embodiment. The shroud edge passage inlet 171 may be provided to other shroud edge passage such as the suction-side shroud edge passage $75_N$, the pressure-side shroud edge passage $75_P$, or the trailing-side shroud edge passage $75_T$. The shroud edge passage outlet 172 may be provided to other shroud edge passage such as the suction-side shroud edge passage $75_N$, the pressure-side shroud edge passage $75_P$, or the leading-side shroud edge passage $75_L$. Alternatively, a plurality of the shroud edge passage inlets 171 may be provided to either one or more of the shroud edge passages $75_L$, $75_T$, $75_N$, $75_P$. Moreover, a plurality of the shroud edge passage outlets 172 may be provided to either one or more of the shroud edge passages $75_L$, $75_T$, $75_N$, $75_P$.

The shroud main body 72 comprises a radially inner wall 81 and a radially outer wall 82 opposite to the radially inner wall 81. The shroud main body 72 contains a hollow space S inside thereof between the radially inner wall 81 and the radially outer wall 82. The radially inner surface of the inner wall 81 constitutes the gas path surface 78 of the outer shroud 70. The radially inner wall 81 constitutes a part of the shroud main body 72. The radially inner wall 81 may be continuously extended outward to constitute a part of the shroud edge 74. FIG. 2 describes, as an embodiment, that the radially inner wall 81 is continuously extended outward to constitute a part of the trailing-side shroud edge $74_T$. The shroud main body 72 contains an impingement plate 73 that partitions the space S of the outer shroud 70 into an outer region on the radially outer side and an inner region (cavity) that is a region on the radially inner side. The outer region is connected to the shroud edge passage outlet 172 such that part of cooling air flows from the trailing-side shroud edge passage $75_T$ into the outer region. The inner region is defined between the impingement plate 73 and the radially inner wall 81 of the outer shroud 70.

In the impingement plate 73, a plurality of air holes 79 are provided to extend through the impingement plate 73 in the radial direction. Part of cooling air present in the outer region flows into the inner cavity through the air holes 79 of the impingement plate 73. The cooling air is jetted from air holes 79 toward a radially outer surface of the radially inner wall 81 for impingement cooling of the radially outer surface of the radially inner wall 81, and then, is ejected through the radially outer wall 82 toward the outer side of the outer wall 82. For example, the cooling air is jetted from air holes 79 toward a radially outer surface of the radially inner wall 81 for impingement cooling of the radially outer surface of the radially inner wall 81, and then, is ejected through a passage which connects the inner region (cavity) of the hollow space(S) and an outside space located on the opposite side of the radially outer wall 82 with respect to the hollow space (S). Such a passage may be isolated from the outer region of the hollow space (S). More specifically, in this embodiment, the cooling air is ejected through a hole of an exit conduit 83. The exit conduit 83 is provided to penetrate through the radially outer wall 82 and the impingement plate 73 to connect the inner region and the outside space.

The vane body 51 comprises a plurality of air channels 141, 142, 143. More specifically, inside of the vane body 51 is partitioned by radially extending partition walls $51_P$ into the plurality of air channels 141, 142, 143. A plurality of inserts 151, 152, 153 are inserted into the respective air channels 141, 142, 143. The plurality of inserts 151, 152, 153 which include respective radially extending inner air channels 161, 162, 163 extend in the radial direction from the outer shroud 70 through the vane body 51 to the inner shroud 60. Each of the inserts 151, 152, 153 is formed continuously from the outer shroud 70 through the vane body 51 to the inner shroud 60. Each of the inner air channels 161, 162, 163 has an air inlet 58 open to the inside of an intake manifold 56.

Each of the inserts 151, 152, 153 has a plurality of apertures (through holes) 59 communicated with the respective inner air channels 161, 162, 163. Part of cooling air which is supplied to the inner air channels 161, 162, 163 of the inserts 151, 152, 153 is jetted from the plurality of apertures 59 toward an inner surface of the vane body 51 for impingement cooling of the inner surface of the airfoil 51. The plurality of air channels 141, 142, 143 have respective outer air channels defined between the inserts 151, 152, 153 and the inner surface of the vane body 51. The part of cooling air which is jetted through the apertures 59 is guided by and flows through the outer air channels in the radially outer direction, in the radially inner direction, or in both the radially outer and inner directions through the outer air channels. As an example, FIG. 3 shows the outer air channel 57 between the side surface of the insert 151 and the inner surface of the leading end part of the vane body 51.

The intake manifold 56 and the exit conduit 83 are connected to a forced air cooling system in which cooling air extracted from an inside of a combustor casing is cooled by an external cooler (not shown), and then, compressed by an external compressor (not shown). The compressed air is used for cooling and then returned to the inside of the combustor casing. In the above-description, the air cooling system is applied to the present embodiment. However, the present stator vane is not limited to such embodiment. The present disclosure may be applied to other type of cooling system. For example, the intake manifold 56 and the exit conduit 83 may be connected to a closed-loop steam cooling system or closed-loop air cooling system. The compressed air used for cooling is supplied to the intake manifold and directly provided to the air inlet 58 first without going through the shroud main body 72 nor the shroud edge 74. In other words, the cooling air is first used for cooling the airfoil 51 before used for cooling the shroud main body 72 or the shroud edge 74.

In the present embodiment, the air channel 141 is a leading end air channel positioned at an upstream end of the vane body 51. For example, in the insert 151 which is a leading end insert, part of cooling air which is supplied to the inner air channel 161 through the air inlet 58 is jetted through the apertures 59 toward the inner surface of the leading end part of the airfoil 51, and then is guided to flow in the radially outer direction through the outer air channel 57. The outer air channel 57 which is a space between the insert 151 and the inner surface of the leading end part of the vane body 51 is communicated with the shroud edge passage inlet 171 of the leading-side shroud edge passage $75_L$. The part of cooling air which is jetted toward the inner surface of the leading end part of the airfoil 51 flows into the shroud edge passage inlet 171 of the leading-side shroud edge passage $75_L$ through the outer air channel 57 which is connected to the shroud edge passage inlet 171.

Figure 5:
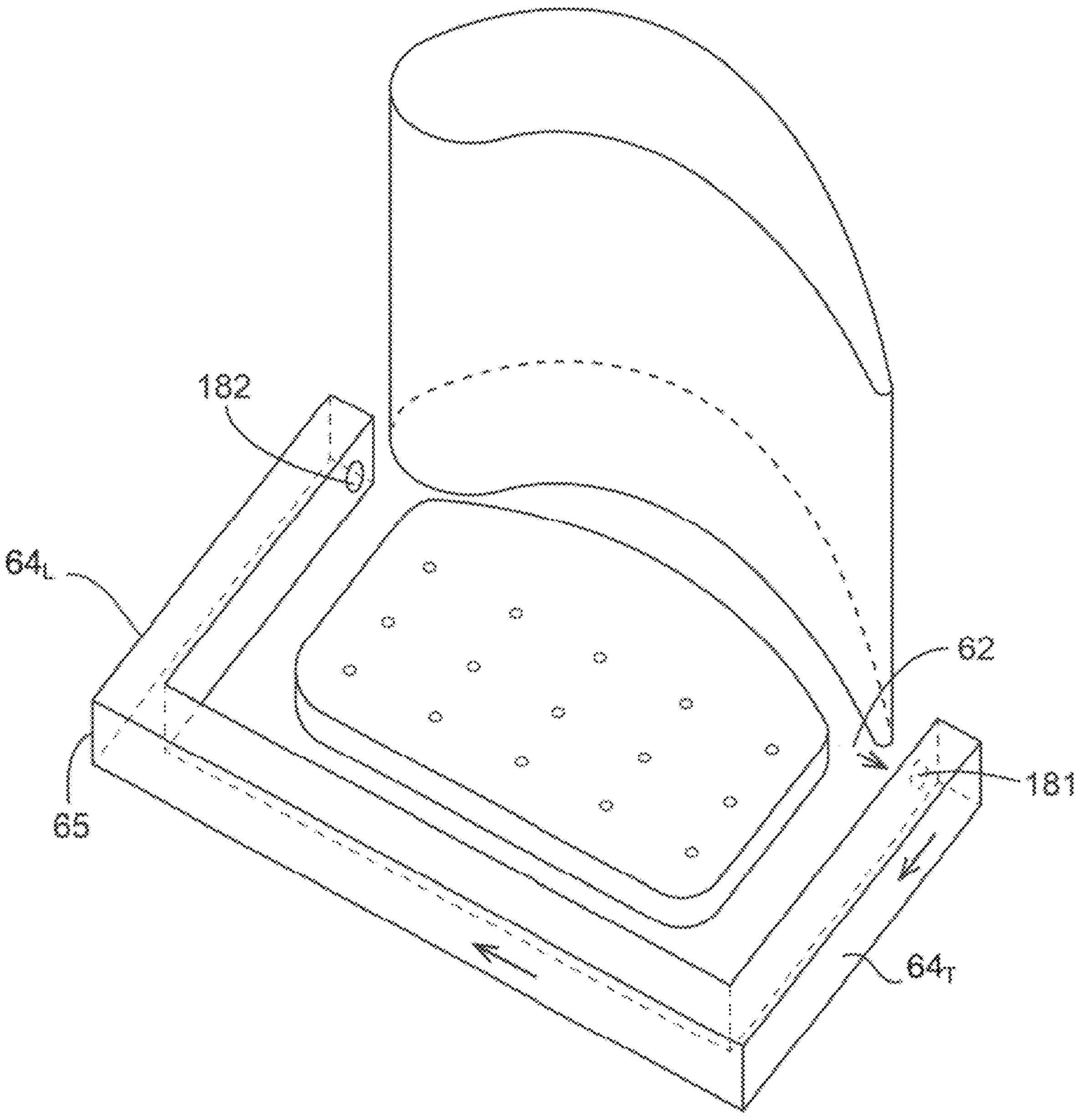
FIG. 5 is a perspective view of a part of a stator vane in the first embodiment.

FIG. 5 is a perspective view of a part of a stator vane in the first embodiment. In the present embodiment, the air channel 142 is an intermediate air channel positioned on a downstream side of the leading end air channel 141 and also positioned between the leading end air channel 141 and a trailing end air channel 143 (described below). For example, in the insert 152 which is an intermediate insert, part of cooling air which is supplied to the inner air channel 162 through the air inlet 58 is jetted through the apertures 59 toward the inner surface of the middle part of the airfoil 51, and then is guided to flow in the radially inner direction through own outer air channel toward the inner shroud 60, then, as shown by FIG. 5, flows into the shroud edge passage inlet 181 of the inner shroud 60 (disposed on a trailing-side shroud edge $\mathbf{64}_T$). The cooling air then flows through the shroud edge passage 65 of the inner shroud 60 to cool the shroud edge 64 of the inner shroud 60, and then, flows into the shroud main body 62 of the inner shroud 60 through the shroud edge passage outlet 182 of the inner shroud 60 (disposed on a leading-side shroud edge $\mathbf{64}_L$). In similar manner to the outer shroud 70, the cooling air is jetted from the air holes of the impingement plate 63 to cool the radially outer wall of the inner shroud 60 which has a gas path surface facing radially outer side and facing the hot gas path.

In the present embodiment, part of cooling air which is jetted from the leading end inner air channel 161 toward the inner surface of the leading end part of the airfoil 51 is guided to flow in the radially outer direction through the outer air channel 57 toward the outer shroud 70. Also, part of cooling air which is jetted from the intermediate inner air channel 162 toward the inner surface of the intermediate part of the airfoil 51 is guided to flow in the radially inner direction through the outer air channel 57 toward the inner shroud 60. However, the structure of the stator vane is not limited to this embodiment. Part of cooling air which is jetted from the leading end inner air channel 161 toward the inner surface of the leading end part of the airfoil 51 may be guided to flow in the radially inner direction through the outer air channel 57 toward the inner shroud 60. Also, part of cooling air which is jetted from the intermediate inner air channel 162 toward the inner surface of the intermediate part of the airfoil 51 may be guided to flow in the radially outer direction through the outer air channel 57 toward the outer shroud 70. Such modification will be further described below as another embodiment.

In some embodiments of this disclosure, as shown by FIG. 2, the air channel 143 is a trailing end air channel positioned at a downstream end of the vane body 51. The trailing end air channel 142 also includes an airfoil cooling structure 154 on a downstream side of the insert 153. The airfoil cooling structure 154 includes a passage inside of which a plurality of pin fins 164 are disposed. For example, in the insert 153 which is a trailing end insert, part of cooling air which is supplied to the inner air channel (trailing end inner air channel) 163 through the air inlet 58 is jetted through the apertures 59 toward the inner surface of a trailing end part of the airfoil 51, then guided to flow to the airfoil cooling structure 154. Part of cooling air flows through the passage with the pin fins 164, and then, is ejected to the hot gas passage at the trailing edge 53 of the airfoil 51.

Figure 6:
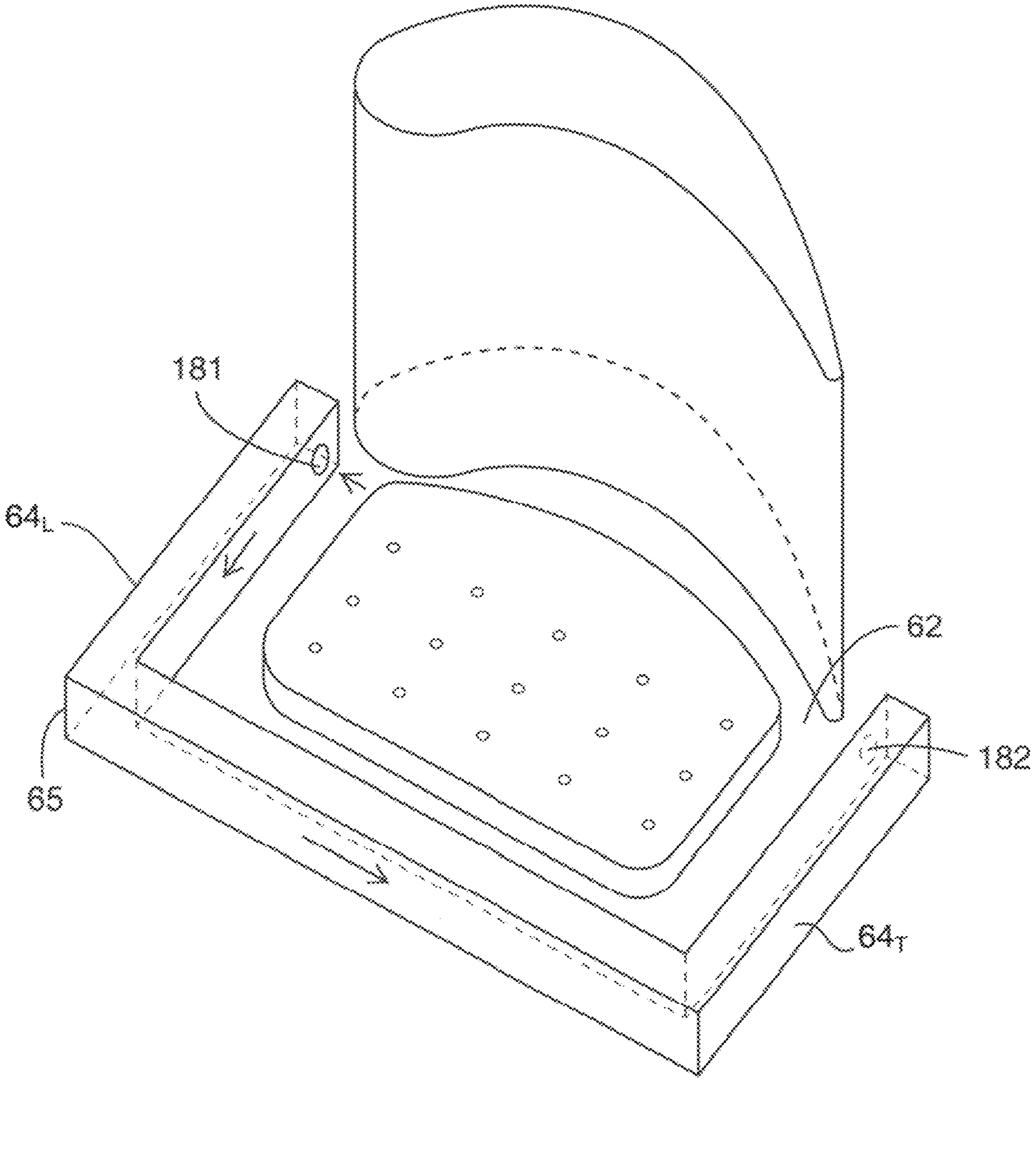
FIG. 6 is a perspective view of a part of a stator vane in another embodiment.

FIG. 6 is a perspective view of a part of a stator vane in another embodiment. As shown by FIG. 6, in this embodiment, the shroud edge passage inlet 181 of the inner shroud 60 is disposed on the leading-side shroud edge $\mathbf{64}_L$. Also, the shroud edge passage outlet 182 of the inner shroud 60 is disposed on the trailing-side shroud edge $\mathbf{64}_T$. Also, in this embodiment, the shroud edge passage inlet 171 of the outer shroud 70 is disposed on the trailing-side shroud edge $\mathbf{74}_T$. Also, the shroud edge passage outlet 172 of the outer shroud 70 is disposed on the leading-side shroud edge $\mathbf{74}_L$. In this embodiment, in the insert 151 which is the leading end insert, part of cooling air which is supplied to the inner air channel 161 through the air inlet 58 is jetted through the apertures 59 toward the inner surface of the leading end part of the airfoil 51, and then is guided to flow in the radially inner direction through the outer air channel 57 toward the inner shroud 60, then, as shown by FIG. 6, flows into the shroud edge passage inlet 181 of the inner shroud 60 (disposed on the leading-side shroud edge $\mathbf{64}_L$). The cooling air then flows through the shroud edge passage 65 of the inner shroud 60 to cool the shroud edge 64 of the inner shroud 60, and then, flows into the shroud main body 62 of the inner shroud 60 through the shroud edge passage outlet 182 of the inner shroud 60 (disposed on the trailing-side shroud edge $\mathbf{64}_T$). Also, in this embodiment, in the insert 152 which is an intermediate insert, part of cooling air which is supplied to the inner air channel 162 through the air inlet 58 is jetted through the apertures 59 toward the inner surface of the middle part of the airfoil 51, and then is guided to flow in the radially outer direction through the outer air channel toward the outer shroud 70, then flows into the shroud edge passage inlet 171 of the outer shroud 70 (disposed on the trailing-side shroud edge $\mathbf{74}_T$). The cooling air then flows through the shroud edge passage 75 of the outer shroud 70 to cool the shroud edge 74 of the outer shroud 70, and then, flows into the shroud main body 72 of the outer shroud 70 through the shroud edge passage outlet 172 of the outer shroud 70 (disposed on the leading-side shroud edge $\mathbf{74}_L$).

Figure 7:
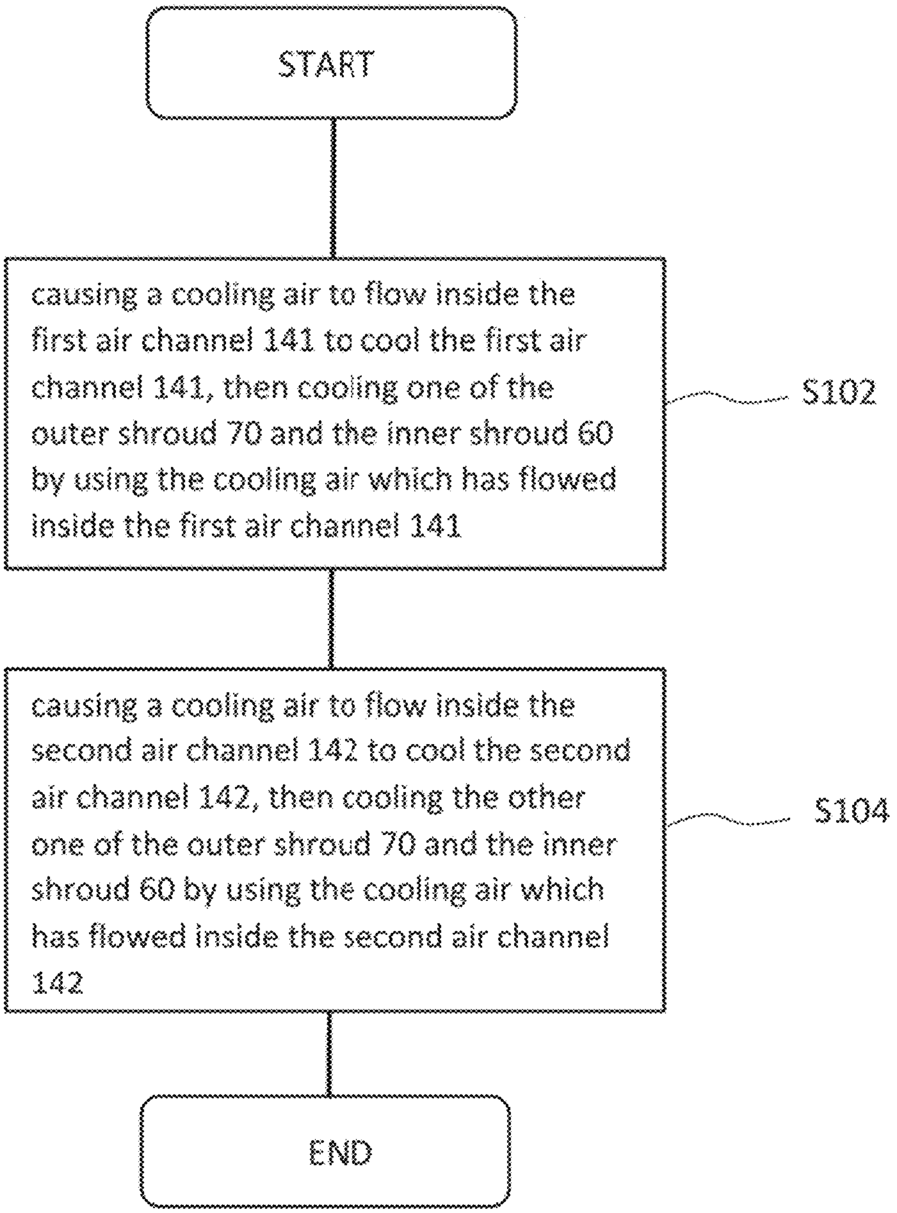
FIG. 7 is a flowchart illustrating a cooling method of the stator vane of the first embodiment.

Next, a cooling method of a stator vane of the first embodiment is described. FIG. 7 is a flowchart illustrating a cooling method of the stator vane of the first embodiment. As shown by FIG. 7, at a step S102, part of cooling air is caused to flow into the leading end air channel 141 to cool the leading end air channel 141. The cooling air is jetted from the leading end inner air channel 161 through the apertures 59 of the insert 151 toward the inner surface of the leading end part of the airfoil 51, and is guided in either one of the radially outer direction or the radially inner direction through the outer air channel 57 toward the outer shroud 70 or the inner shroud 60 to cool the outer shroud 70 or the inner shroud 60.

At a step S104, part of cooling air is caused to flow into the intermediate air channel 142 to cool the intermediate air channel 142. The cooling air is jetted from the intermediate inner air channel 162 through the apertures 59 of the insert 152 toward the inner surface of the intermediate part of the airfoil 51, and is guided in the other one of the radially outer direction or in the radially inner direction through the outer air channel 57 toward the outer shroud 70 or the inner shroud 60 to cool the other one of the outer shroud 70 or the inner shroud 60.

Figure 8:
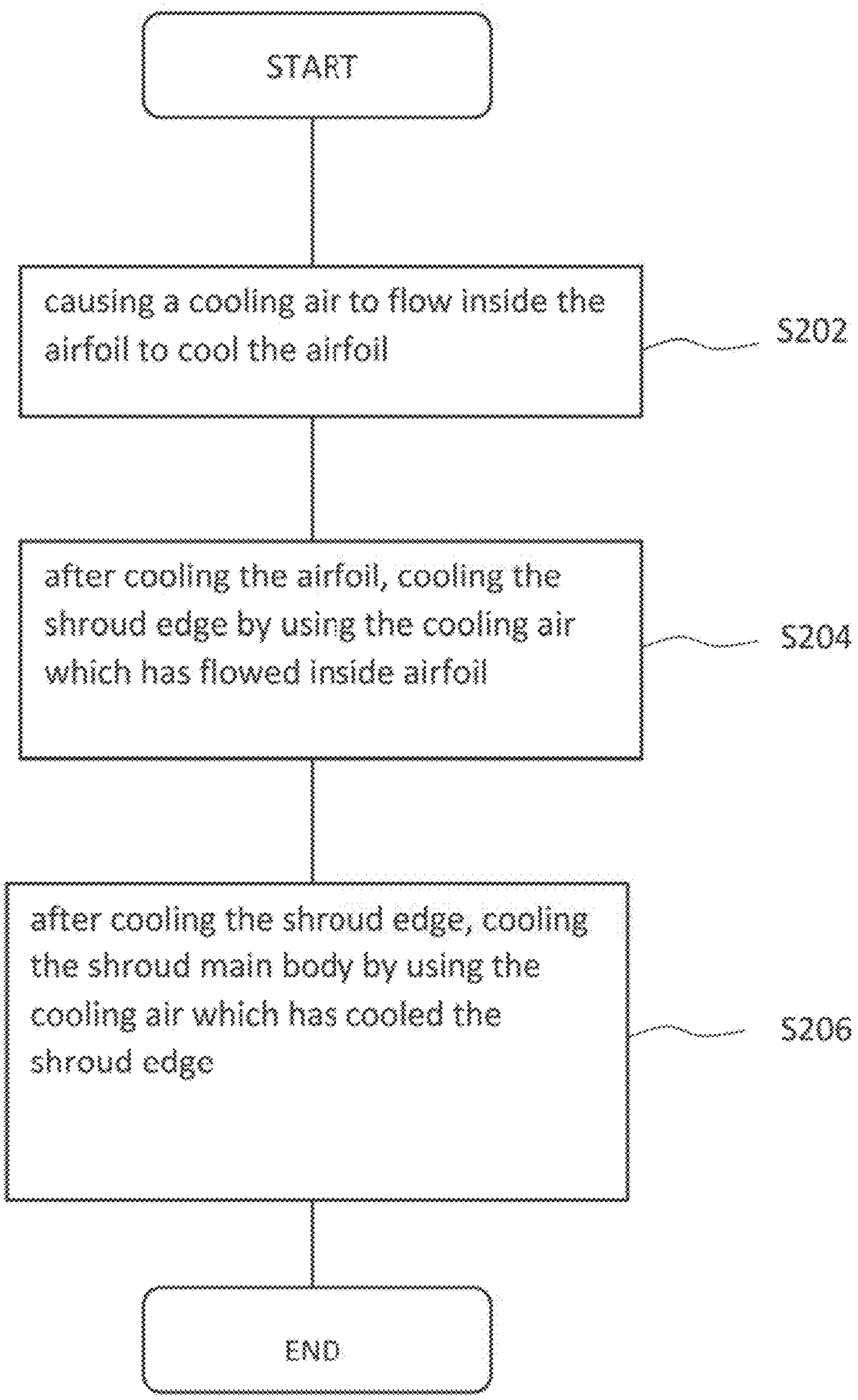
FIG. 8 is a flowchart illustrating a cooling method of the stator vane of the second embodiment.
Figure 9:
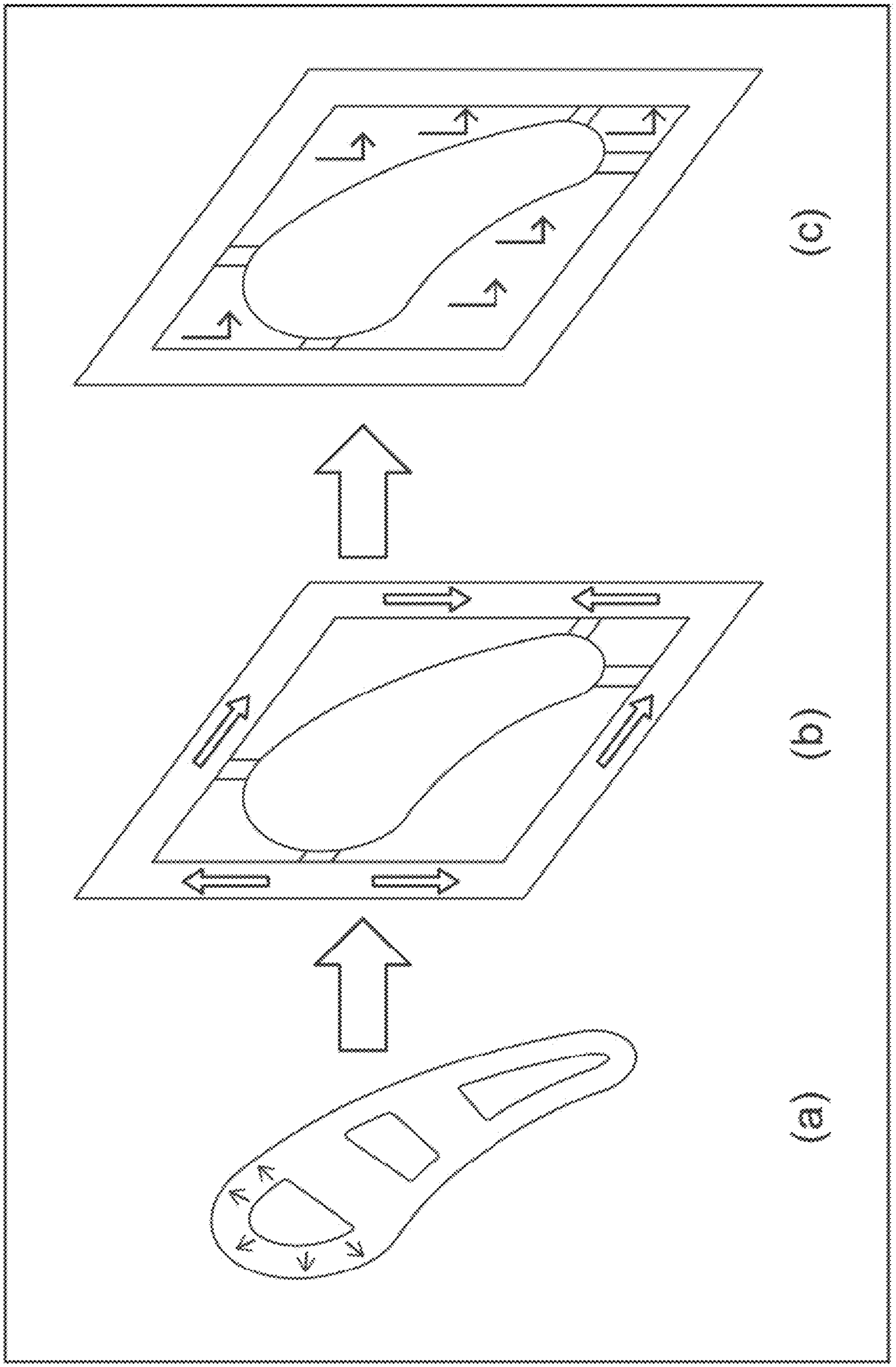
FIG. 9 schematically illustrates cooling steps of the second embodiment.

Next, a cooling method of a stator vane of the second embodiment is described. FIG. 8 is a flowchart illustrating a cooling method of the stator vane of the second embodiment. This method is described by using the air channel 141 and the outer shroud 70 as examples. FIG. 9 schematically illustrates cooling steps of the second embodiment. As shown by FIG. 8 and FIG. 9(*a*), at a step S202, part of cooling air is caused to flow into the inner air channel 161 of the insert 151 through the air inlet 58. The cooling air is then jetted through the apertures 59 toward the inner surface of the leading end part of the airfoil 51 to cool the airfoil 51, and then, flows in the radially outer direction through the outer air channel 57. In some of this embodiment, the part of cooling air which is caused to flow into the inner air channel 161 may be introduced from the forced air cooling system.

As shown by FIG. 9(*b*), at a step S204, the cooling air is caused to flow into the shroud edge passage 75 through the shroud edge passage inlet 171. The cooling air flows along and through the shroud edge passage 75 to cool the shroud edge 75.

As shown by FIG. 9(*c*), at a step S206, the cooling air flows into the outer region of the shroud main body 72 and is jetted through the air holes 79 toward the radially outer surface of the radially inner wall 81 for impingement cooling of the radially outer surface of the radially inner plate 81 to cool the shroud main body 72.

Figure 10:
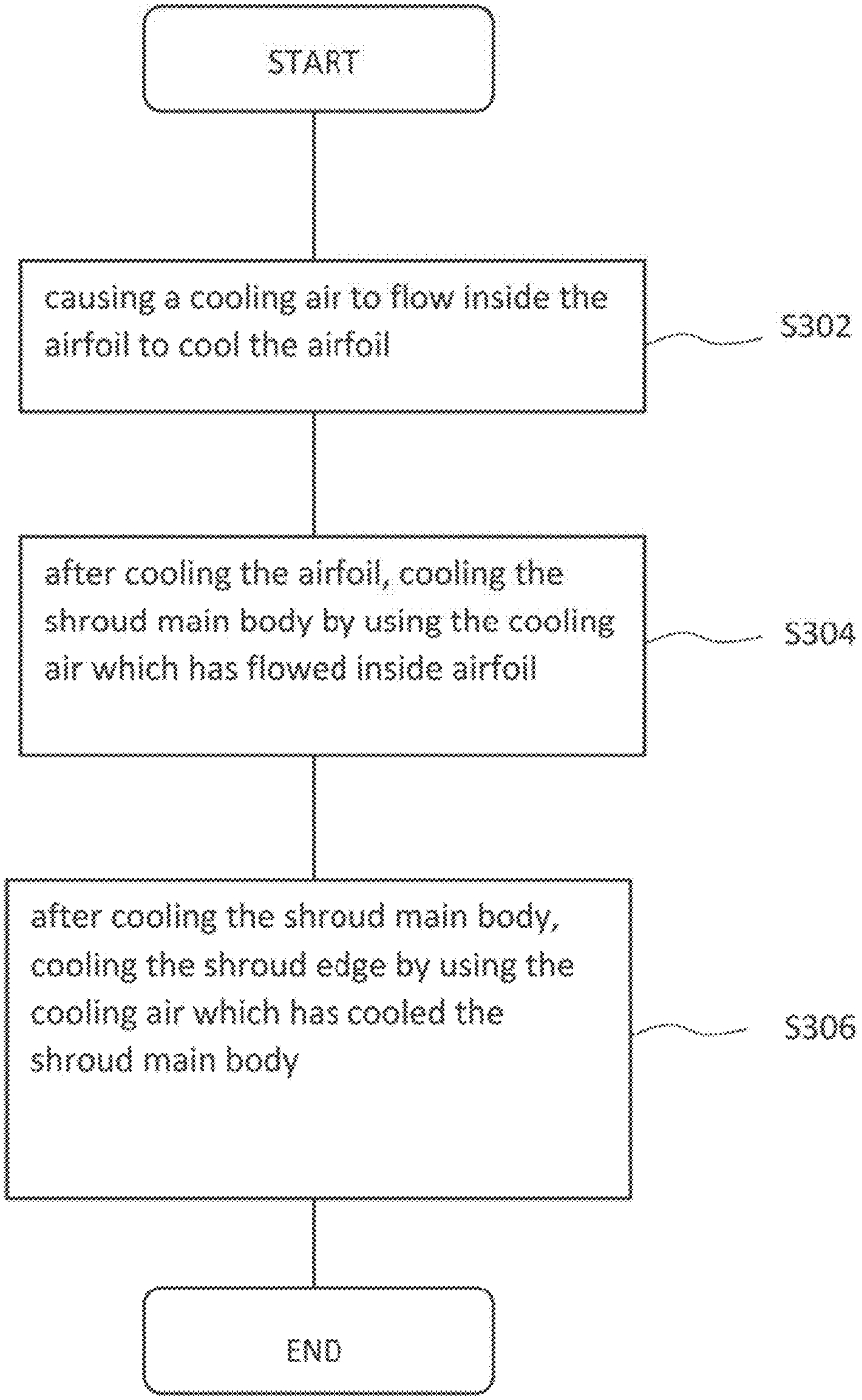
FIG. 10 is a flowchart illustrating a cooling method of the stator vane of the third embodiment.

Next, a cooling method of a stator vane of third embodiment is described. FIG. 10 is a flowchart illustrating a cooling method of the stator vane of the third embodiment. As shown by FIG. 10, at a step S302, in at least one of the air channels, part of cooling air is caused to flow into the inner air channel of the insert through the air inlet. The cooling air is then jetted through the apertures toward the inner surface of the leading end part of the airfoil to cool the airfoil, and then, flows in the radially outer direction through the outer air channel. In some of this embodiment, the part of cooling air which is caused to flow into the inner air channel may be introduced from the forced air cooling system.

At a step S304, the cooling air is caused to flow into the outer region of the shroud main body and is jetted through the air holes toward the radially outer surface of the radially inner wall for impingement cooling of the radially outer surface of the radially inner wall to cool the shroud main body.

At a step S306, the cooling air is caused to flow into shroud edge passage through the shroud edge passage inlet. The cooling air flows along and through the shroud edge passage to cool the shroud edge. In some of this embodiment, the cooling air may be returned to the forced air cooling system through the shroud edge passage outlet.

Figure 11:
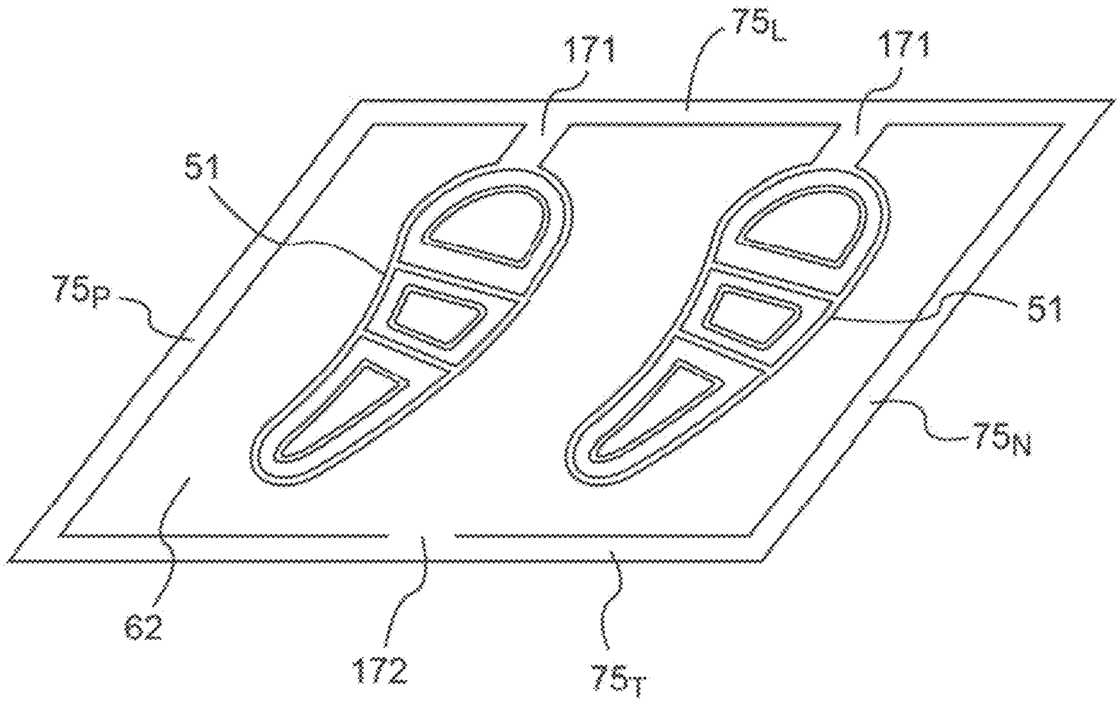
FIG. 11 is a schematic sectional view of a stator vane according to the fourth embodiment.

Next, the fourth embodiment of the present application is described below. FIG. 11 is a schematic sectional view of a stator vane according to the fourth embodiment. As shown by FIG. 11, in the fourth embodiment, a plurality of the airfoils 51 (two airfoils in this embodiment) are surrounded by the shroud edge passages $\mathbf{75}_L$, $\mathbf{75}_T$, $\mathbf{75}_N$, $\mathbf{75}_P$. Differently from the first embodiment (FIG. 3), two shroud edge passage inlets 171 are provided to the leading-side shroud edge passage $\mathbf{75}_L$.

The respective outer air channels which is a space between the insert 151 and the inner surface of the leading end part of the two airfoils 51 are communicated with the respective shroud edge passage inlets 171 of the leading-side shroud edge passage $\mathbf{75}_L$ through the respective air passages provided in an outer end of the respective outer air channels of the respective airfoils 51. The cooling air flows into the leading-side shroud edge passage $\mathbf{75}_L$ through the respective shroud edge passage inlets 171 and flows through the suction-side shroud edge passage $\mathbf{75}_N$, or the pressure-side shroud edge passages $\mathbf{75}_P$, then flows into the outer region of the shroud main body 72 through the shroud edge passage outlet 172.

In the above embodiments, the vane body (airfoil) includes three air channels 141, 142, 143. However, the number of the air channels included in the vane body (airfoil) is not limited to three. The vane body (airfoil) may include different number of air channels such as two, four, five or more. In such a modified embodiment, each air channel may be connected to the outer shroud or the inner shroud.

Figure 12B:
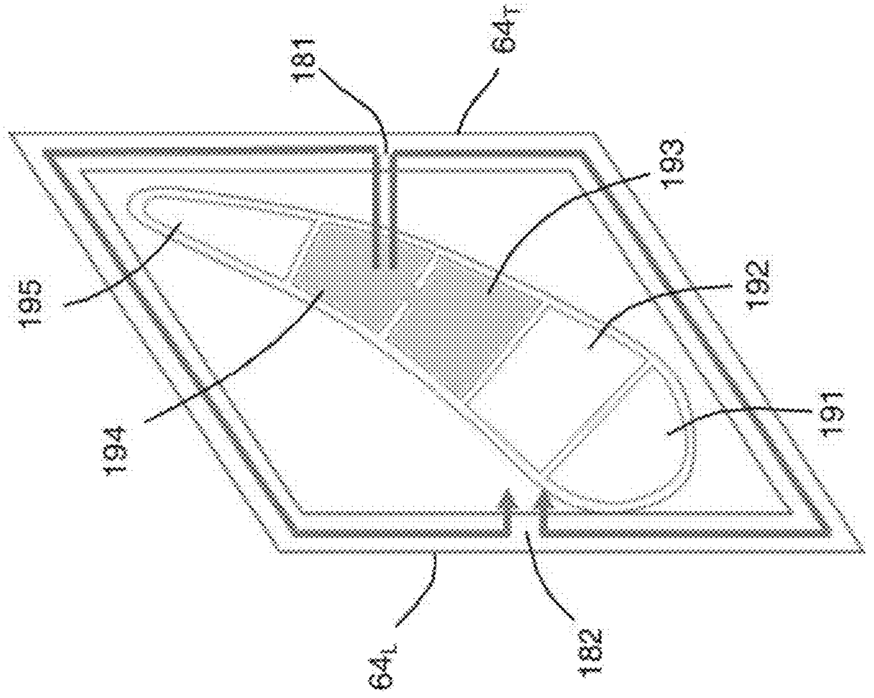
FIGS. 12A and 12B are respectively a schematic sectional view of a stator vane according to the fifth embodiment.
Figure 12A:
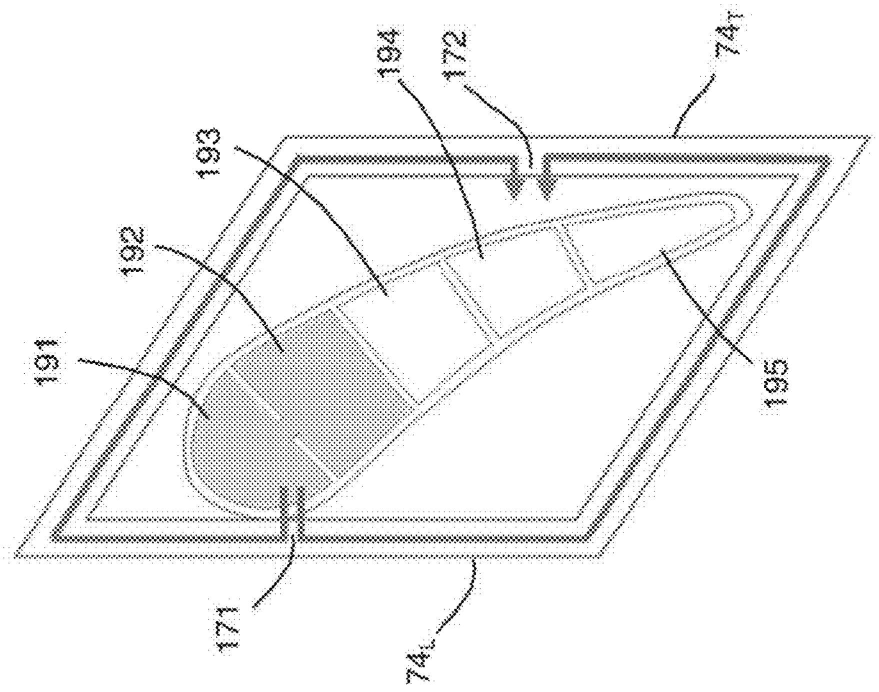

For example, the fifth embodiment of the present application is described below. FIGS. 12A and 12B are respectively a schematic sectional view of a stator vane according to the fifth embodiment. As shown by FIGS. 12A and 12B, in the fifth embodiment, the vane body (airfoil) includes air channels 191, 192, 193, 194 and 195 located in this order from an upstream end to a downstream end thereof with respect to the flow of hot gas in the turbine. The air channels 191, 192, 193, 194 and 195 respectively includes an insert and an inner air channel (not shown). As shown by FIG. 12A, the first air channel 191 and the second air channel 192 are communicated with the shroud edge passage inlet 171 of the outer shroud 70 disposed at the leading-side shroud edge $\mathbf{74}_L$. Also, as shown by FIG. 12B, the third air channel 193 and the fourth air channel 194 are communicated with the shroud edge passage inlet 181 of the inner shroud 60 disposed at the trailing-side shroud edge $\mathbf{64}_T$.

In the present embodiment, part of cooling air which is introduced in the first air channel 191 flows inside the first air channel 191 and is jetted from a first inner air channel through the apertures 59 of a first insert toward the inner surface of the leading end part of the airfoil 51, then is guided to flow in the radially outer direction through the outer air channel 57 toward the outer shroud 70. Similarly, part of cooling air which is jetted from a second inner air channel of the second air channel 192 through the apertures 59 of a second insert toward the inner surface of the intermediate part of the airfoil 51 is guided to flow in the radially outer direction through the own outer air channel 57 toward the outer shroud 70. Then, the cooling air is guided into the shroud edge passage inlet 171 of the outer shroud 70.

In the present embodiment, part of cooling air which is jetted from a third inner air channel of the third air channel 193 through the apertures 59 of a third insert toward the inner surface of the intermediate part of the airfoil 51 is guided to flow in the radially inner direction through the own outer air channel 57 toward the inner shroud 60. Also, part of cooling air which is jetted from a fourth inner air channel of the fourth air channel 194 through the apertures 59 of a fourth insert toward the inner surface of the intermediate part of the airfoil 51 is guided to flow in the radially inner direction through the own outer air channel 57 toward the inner shroud 60. Then, the cooling air is guided into the shroud edge passage inlet 181 of the inner shroud 60.

The fifth air channel 195 is a trailing end air channel positioned at a downstream end of the vane body 51. As described above, in the fifth air channel 195, part of cooling air which is supplied to a fifth inner air channel through the air inlet 58 is jetted through the apertures 59 toward the inner surface of a trailing end part of the airfoil 51, then guided to flow to the airfoil cooling structure 154. Part of cooling air flows through the passage with the pin fins 164, and then, is ejected to the hot gas passage at the trailing edge 53 of the airfoil 51.

The structure of the stator vane is not limited to this embodiment. As an alternative embodiment, the shroud edge passage inlet 171 of the outer shroud 70 may be disposed at the trailing-side shroud edge $\mathbf{74}_T$ and the shroud edge passage outlet 172 of the outer shroud 70 may be disposed at the leading-side shroud edge $\mathbf{74}_L$. Also, the shroud edge passage inlet 181 of the inner shroud 60 may be disposed at the leading-side shroud edge $\mathbf{64}_L$ and the shroud edge passage outlet 182 of the inner shroud 60 is disposed at the trailing-side shroud edge $\mathbf{64}_T$. In this embodiment, the first air channel 191 and the second air channel 192 are communicated with the shroud edge passage inlet 181 of the inner shroud 60 disposed at the leading-side shroud edge $\mathbf{64}_L$. Also, the third air channel 193 and the fourth air channel 194 are communicated with the shroud edge passage inlet 171 of the outer shroud 70 disposed at the trailing-side shroud edge $\mathbf{74}_T$.

Figure 13A:
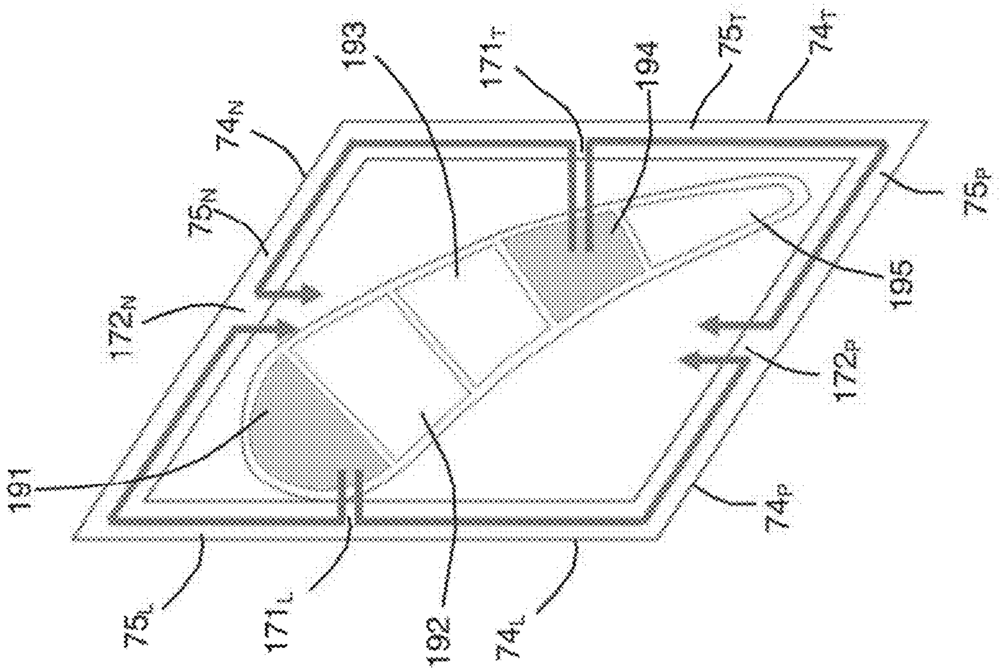
FIGS. 13A and 13B are respectively a schematic sectional view of a stator vane according to the sixth embodiment.
Figure 13B:
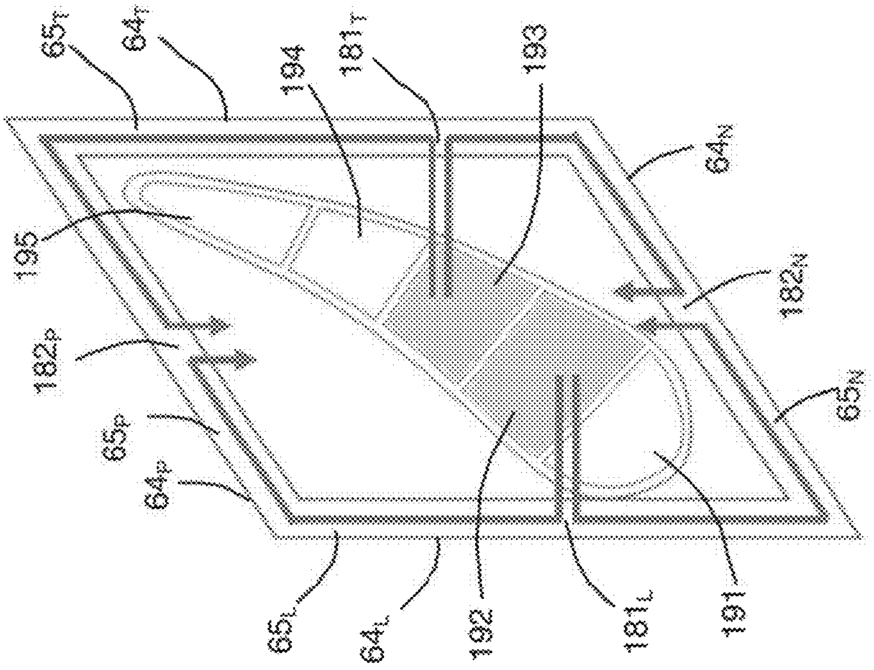

Next, the sixth embodiment of the present application is described below. FIGS. 13A and 13B are respectively a schematic sectional view of a stator vane according to the sixth embodiment. In this embodiment, the outer shroud 70 includes two shroud edge passage inlets (a leading-side shroud edge passage inlet $\mathbf{171}_L$ and a trailing-side shroud edge passage inlet $\mathbf{171}_T$), and two shroud edge passage outlets (a pressure-side shroud edge passage outlet $\mathbf{172}_P$ and a suction-side shroud edge passage outlet $\mathbf{172}_N$). The leading-side shroud edge passage inlet $\mathbf{171}_L$ is provided to the leading-side shroud edge $\mathbf{74}_L$. The trailing-side shroud edge passage inlet $\mathbf{171}_T$ is provided to the trailing-side shroud edge $\mathbf{74}_T$. The pressure-side shroud edge passage outlet $\mathbf{172}_P$ is provided to the pressure-side shroud edge $\mathbf{74}_P$. The suction-side shroud edge passage outlet $\mathbf{172}_N$ is provided to the suction-side shroud edge $\mathbf{74}_N$. The air channels 191, 192, 193, 194 and 195 respectively includes an insert and an inner air channel (not shown).

In this embodiment, the inner shroud 60 includes two shroud edge passage inlets (a leading-side shroud edge passage inlet $\mathbf{181}_L$ and a trailing-side shroud edge passage inlet $\mathbf{181}_T$), and two shroud edge passage outlets (a pressure-side shroud edge passage outlet $\mathbf{182}_P$ and a suction-side shroud edge passage outlet $\mathbf{182}_N$). The leading-side shroud edge passage inlet $\mathbf{181}_L$ is provided to the leading-side shroud edge $\mathbf{64}_L$. The trailing-side shroud edge passage inlet $\mathbf{181}_T$ is provided to the trailing-side shroud edge $\mathbf{64}_T$. The pressure-side shroud edge passage outlet $\mathbf{182}_P$ is provided to the pressure-side shroud edge $\mathbf{64}_P$. The suction-side shroud edge passage outlet $\mathbf{182}_N$ is provided to the suction-side shroud edge $\mathbf{64}_N$.

As shown by FIG. 13A, the first air channel 191 is communicated with the shroud edge passage inlet $\mathbf{171}_L$ of the outer shroud 70 disposed at the leading-side shroud edge $\mathbf{74}_L$. Also, the fourth air channel 194 is communicated with the shroud edge passage inlet $\mathbf{171}_T$ of the outer shroud 70 disposed at the trailing-side shroud edge $\mathbf{74}_T$. As shown by FIG. 13B, the second air channel 192 is communicated with the shroud edge passage inlet $\mathbf{181}_L$ of the inner shroud 60 disposed at the leading-side shroud edge $\mathbf{64}_L$. The third air channel 193 is communicated with the shroud edge passage inlet $\mathbf{181}_T$ of the inner shroud 60 disposed at the trailing-side shroud edge $\mathbf{64}_T$.

In this embodiment, for example, part of cooling air which is supplied to the first air channel 191 is jetted from a first inner air channel through the apertures 59 of a first insert toward the inner surface of the leading end part of the airfoil 51, and then is guided to flow in the radially outer direction through the own outer air channel toward the outer shroud 70, then, as shown by FIG. 13A, flows into the leading-side shroud edge passage inlet $\mathbf{171}_L$. The cooling air then flows along the leading-side shroud edge passage $\mathbf{75}_L$. Then, the cooling air flows along the pressure-side shroud edge passage $\mathbf{75}_P$, then flows out from pressure-side shroud edge passage outlet $\mathbf{172}_P$, also flows along the suction-side shroud edge passage $\mathbf{75}_N$, then flows out from pressure-side shroud edge passage outlet $\mathbf{172}_N$. In this embodiment, for example, part of cooling air which is supplied to the fourth air channel 194 is jetted from a fourth inner air channel through the apertures 59 of a fourth insert toward the inner surface of the middle end part of the airfoil 51, and then is guided to flow in the radially outer direction through the own outer air channel toward the outer shroud 70, then, as shown by FIG. 13A, flows into the trailing-side shroud edge passage inlet $\mathbf{171}_T$. The cooling air then flows along the trailing-side shroud edge passage $\mathbf{75}_T$. Then, the cooling air flows along the pressure-side shroud edge passage $\mathbf{75}_P$, then flows out from pressure-side shroud edge passage outlet $\mathbf{172}_P$, also flows along the suction-side shroud edge passage $\mathbf{75}_N$, then flows out from pressure-side shroud edge passage outlet $\mathbf{172}_N$.

In this embodiment, for example, part of cooling air which is supplied to the second air channel 192 is jetted from a second inner air channel through the apertures 59 of a second insert toward the inner surface of the middle part of the airfoil 51, and then is guided to flow in the radially inner direction through the own outer air channel toward the inner shroud 60, then, as shown by FIG. 13B, flows into the leading-side shroud edge passage inlet $\mathbf{181}_L$. The cooling air then flows along the leading-side shroud edge passage $\mathbf{65}_L$. Then, the cooling air flows along the pressure-side shroud edge passage $\mathbf{65}_P$, then flows out from pressure-side shroud edge passage outlet $\mathbf{182}_P$, also flows along the suction-side shroud edge passage $\mathbf{65}_N$, then flows out from pressure-side shroud edge passage outlet $\mathbf{182}_N$. In this embodiment, for example, part of cooling air which is supplied to the third air channel 193 is jetted from a third inner air channel through the apertures 59 of a third insert toward the inner surface of the middle end part of the airfoil 51, and then is guided to flow in the radially inner direction through the own outer air channel toward the inner shroud 60, then, as shown by FIG. 13B, flows into the trailing-side shroud edge passage inlet $\mathbf{181}_T$. The cooling air then flows along the trailing-side shroud edge passage $\mathbf{65}_T$. Then, the cooling air flows along the pressure-side shroud edge passage $\mathbf{65}_P$, then flows out from pressure-side shroud edge passage outlet $\mathbf{182}_P$, also flows along the suction-side shroud edge passage $\mathbf{65}_N$, then flows out from pressure-side shroud edge passage outlet $\mathbf{182}_N$.

The fifth air channel 195 is a trailing end air channel positioned at a downstream end of the vane body 51. As described above, in the fifth air channel 195, part of cooling air which is supplied to a fifth inner air channel through the air inlet 58 is jetted through the apertures 59 toward the inner surface of a trailing end part of the airfoil 51, then guided to flow to the airfoil cooling structure 154. Part of cooling air flows through the passage with the pin fins 164, and then, is ejected to the hot gas passage at the trailing edge 53 of the airfoil 51.

The structure of the stator vane is not limited to this embodiment. As an alternative embodiment, the first air channel 191 may be communicated with the shroud edge passage inlet $\mathbf{181}_L$ of the inner shroud 60 disposed at the leading-side shroud edge $\mathbf{64}_L$. Also, the fourth air channel 194 may be communicated with the shroud edge passage inlet $\mathbf{181}_T$ of the inner shroud 60 disposed at the trailing-side shroud edge $\mathbf{64}_T$. Also, the second air channel 192 may be communicated with the shroud edge passage inlet $\mathbf{171}_L$ of the outer shroud 70 disposed at the leading-side shroud edge $\mathbf{74}_L$. The third air channel 193 is communicated with the shroud edge passage inlet $\mathbf{171}_T$ of the outer shroud 70 disposed at the trailing-side shroud edge $\mathbf{74}_T$.

Figure 14:
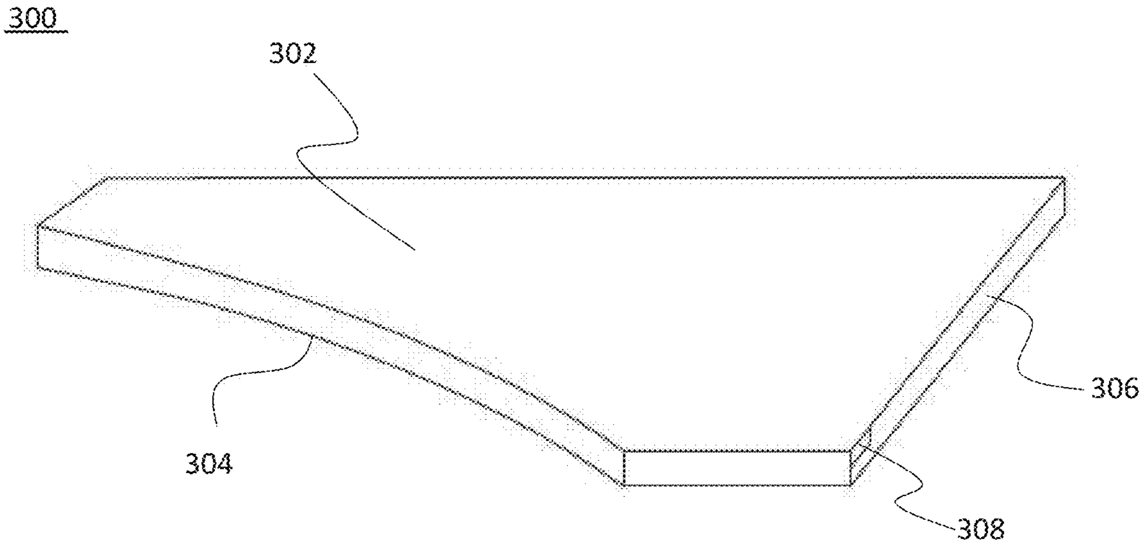
FIG. 14 is a perspective view of the seventh embodiment.
Figure 15:
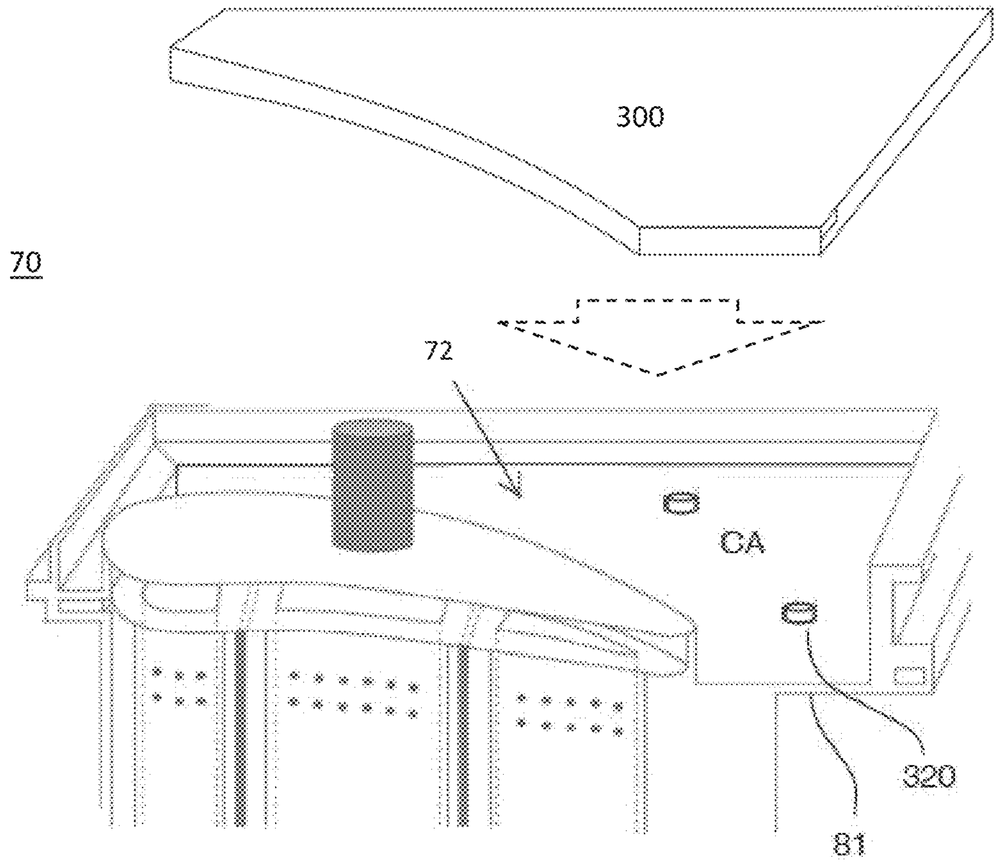
FIG. 15 is a schematic view of the seventh embodiment.
Figure 16A:
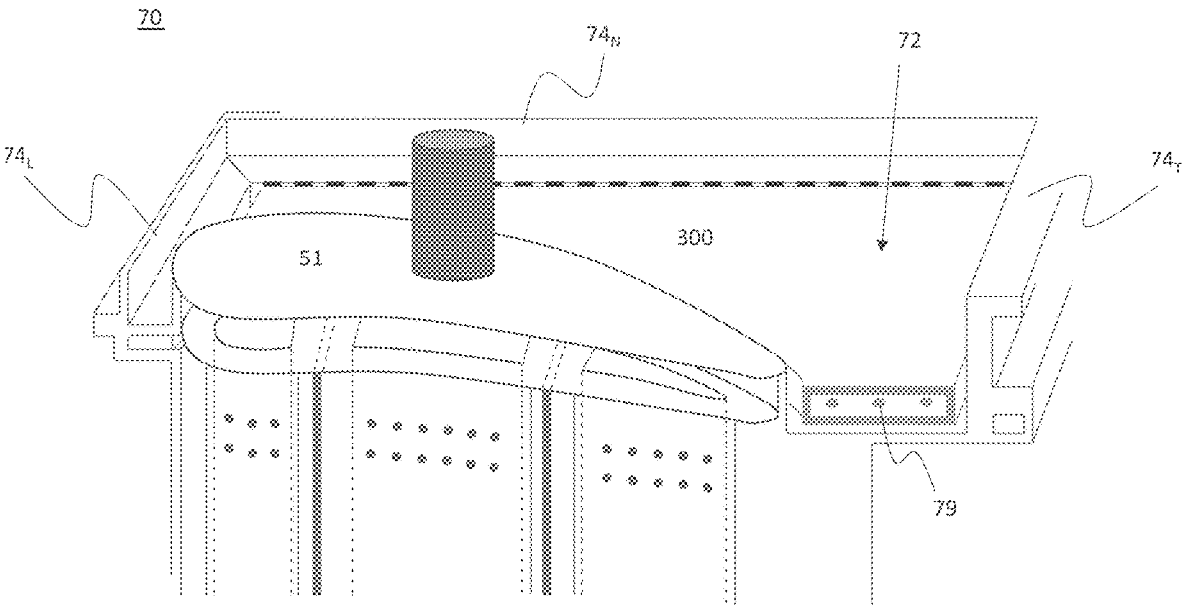
FIG. 16A is a perspective view of a stator vane in the seventh embodiment.

Next, the seventh embodiment of the present application is described below. FIG. 14 is a perspective view of the seventh embodiment. FIG. 15 is a schematic view of the seventh embodiment. FIG. 16A is a perspective view of a stator vane in the seventh embodiment. This embodiment is described by using the outer shroud 70 as one example. As shown by FIG. 16A, the outer shroud main body 72 includes an impingement box 300. As shown by FIG. 15, the impingement box 300 is inserted into a cavity CA formed in the shroud main body 72. The cavity CA is a space surrounded by the shroud edge 74 and the radially inner wall 81. In the cavity CA, one or more spacer 320 is disposed.

As shown by FIG. 14, the impingement box 300 is a box shaped structure which has a hollow chamber inside thereof. The impingement box 300 includes a front wall 302, a rear wall 304 and circumferential side wall 306. The impingement box 300 also includes a box air inlet 308 in the circumferential side wall 306. The box air inlet 308 is connected to the shroud edge passage outlet 172 to introduce the cooling air into the hollow chamber inside thereof. After fixed to the shroud main body 72, the front wall 302 constitutes the radially outer wall 82, and the rear wall 304 constitutes the impingement plate 73. Thus, the rear wall 304 has a plurality of air holes 79.

The front wall 302, the rear wall 304, and the circumferential side wall 306 are connected one another to provide an airtight chamber inside the impingement box 300 other than the part of the box air inlet 308 and the air holes 79.

FIG. 16A shows a state in which the impingement box 300 is installed in and attached to the outer shroud 70. The impingement box 300 is fixed to the shroud edge 74, for example, by welding, or brazing. In FIG. 16A, dashed line indicates a welding portion between the impingement box 300 and the shroud edge 74. As an example, the impingement box 300 is welded to the suction-side shroud edge $\mathbf{74}_N$. The impingement box 300 may be welded to other parts of the shroud edge 74 such as the leading-side shroud edge $\mathbf{74}_L$, the trailing-side shroud edge $\mathbf{74}_T$, or the pressure-side shroud edge $\mathbf{74}_P$. Moreover, the impingement box 300 may be welded to the airfoil 51.

Figure 16B:
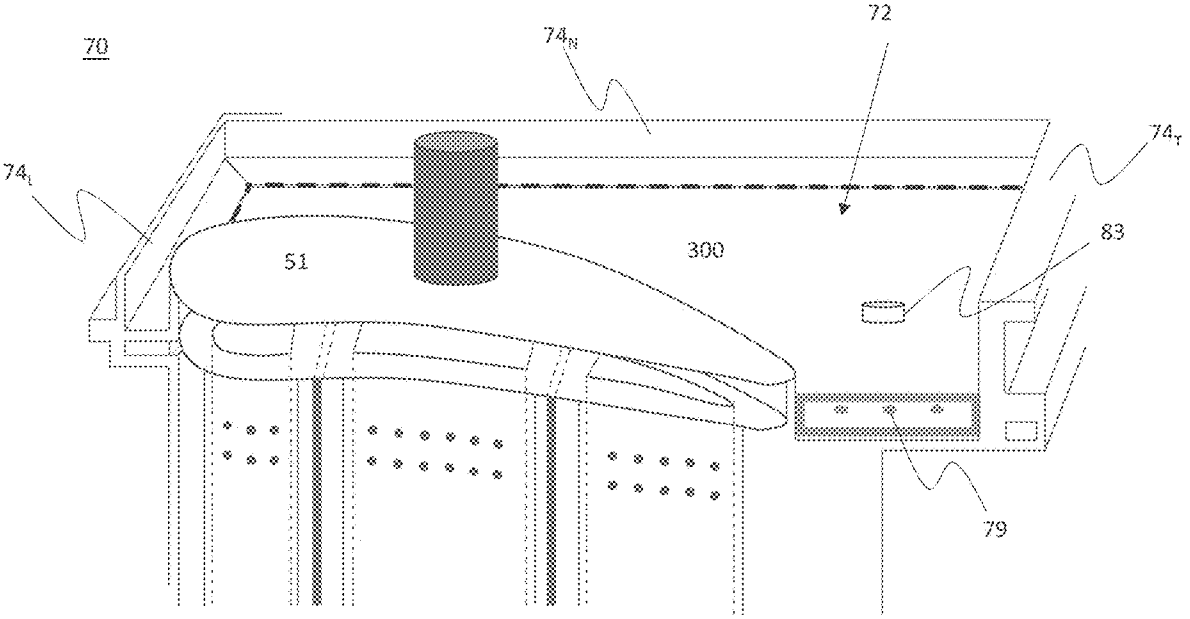
FIG. 16B is perspective view of a modification of the seventh embodiment.

For example, FIG. 16B is perspective view of a modification of the seventh embodiment. In FIG. 16B, the circumferential edge of the front wall 302 is welded to the suction-side shroud edge $\mathbf{74}_N$, the leading-side shroud edge $\mathbf{74}_L$, the trailing-side shroud edge $\mathbf{74}_T$ and the side surface of the airfoil 51. By welding the circumferential edge of the front wall 302 to the suction-side shroud edge $\mathbf{74}_N$, the leading-side shroud edge $\mathbf{74}_L$, the trailing-side shroud edge $\mathbf{74}_T$ and the side surface of the airfoil 51, sealing structure is provided along the circumference of the front wall 302. As shown FIG. 16B, the exit conduit 83 may be provided to penetrate through the front wall and the impingement plate (rear wall) to connect the inner region and the outside space.

Figure 17:
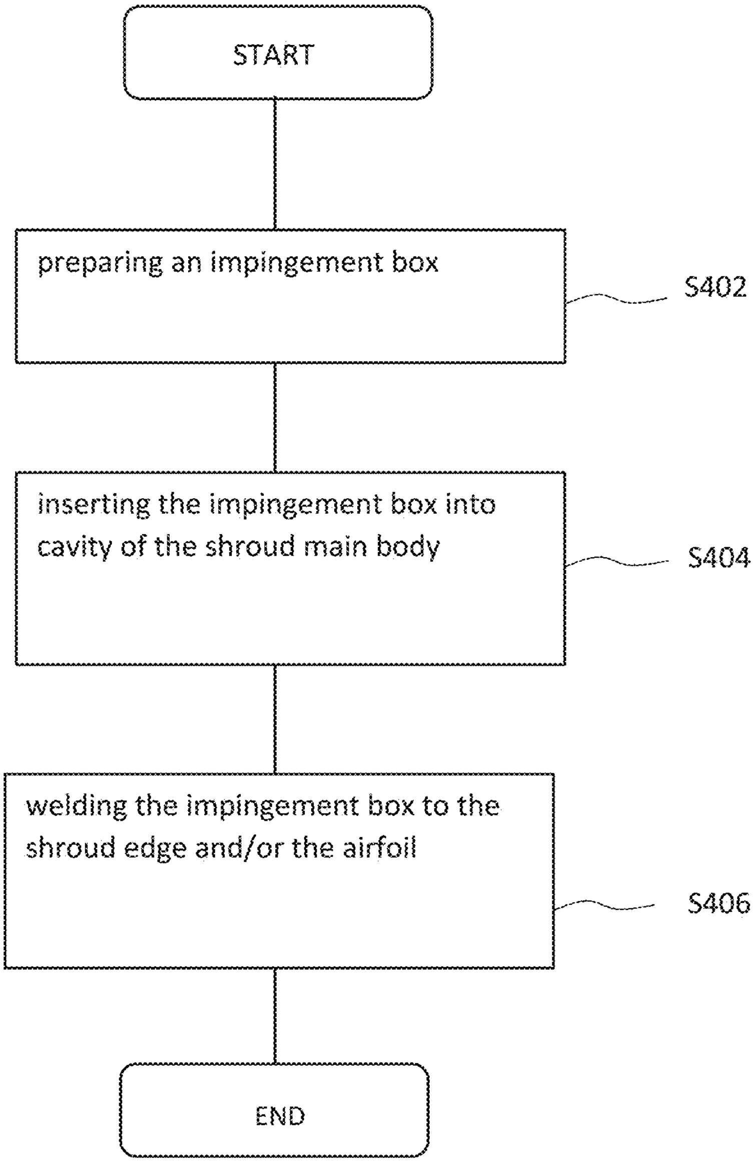
FIG. 17 is a flowchart illustrating a manufacturing method of a shroud of a vane of a turbine.

Next, a manufacturing method of a shroud of a vane of a turbine is described. FIG. 17 is a flowchart illustrating a manufacturing method of a shroud of a vane of a turbine. As shown by FIG. 17, at a step S402, the impingement box 300 is prepared. Then, at a step S404, the impingement box 300 is inserted into the cavity CA of the shroud main body 72 such that the rear wall 304 faces the radially outer surface of the radially inner wall 81. Then, the impingement box 300 is welded to the shroud edge 74 and/or a side surface of the airfoil 51 to provide sealing along the circumference of the front wall 302.

In these steps, the spacer 320 may provide support to the rear wall 304. As shown by FIG. 15, the shroud main body 72 may have a spacer 320 on a surface of the radially inner wall 81. The spacer 320 provides support to the rear wall 304 which facilitates positioning of the impingement box 300 and having space between the radially inner wall 81 of the shroud main body 72 and the rear wall 304.

According to this embodiment, by inserting and welding the impingement box 300 to the outer shroud 70, the inner region and the outer region of the space S of the shroud main body 72 is formed. Thus, because the sealing is provided along the circumference of the front wall 302, the inner region and the outer region of the space S of the shroud main body 72 may be easily sealed by welding the impingement box 300 to the suction-side shroud edge $\mathbf{74}_N$, the leading-side shroud edge $\mathbf{74}_L$, the trailing-side shroud edge $\mathbf{74}_T$ and the side surface of the airfoil 51. Moreover, the exit conduit 83 may collect and eject the cooling air from the sealed space after impingement cooling.

The above embodiment is described by using as an example the outer shroud 70. However, this embodiment may be applied to the inner shroud 60 in similar manner. The above embodiment is described by using as an example the impingement box 300 which is installed to the suction-side of the shroud main body 72. The shroud main body 72 may also has another counterpart impingement box 300 to the pressure-side thereof. The another impingement box 300 has the same structure, and thus, delated description is omitted.

Figure 18:
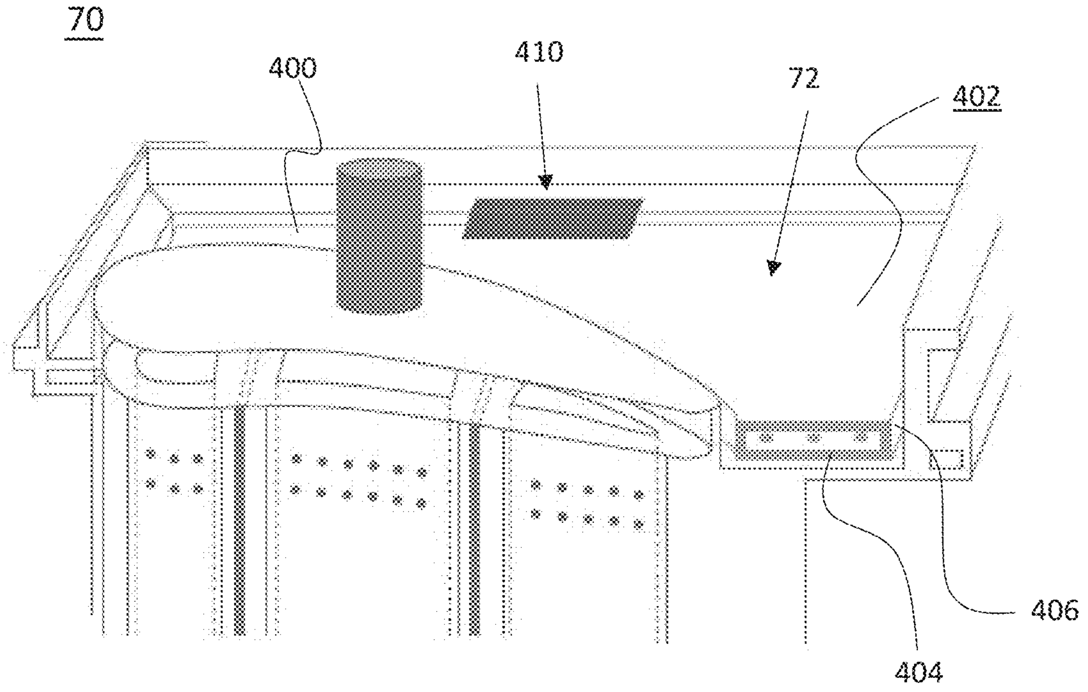
FIG. 18 is a perspective view of a stator vane in a eighth embodiment.

Next, the eighth embodiment of the present application is described below. FIG. 18 is a perspective view of a stator vane in an eighth embodiment. This embodiment is described by using the outer shroud 70 as one example. As shown by FIG. 18, the outer shroud main body 72 includes an impingement box 400. Like the impingement box 300, the impingement box 400 also includes a front wall 402, the rear wall 404, and the circumferential side wall 406. The rear wall 404 includes air holes 79. The impingement box 400 also includes a box air inlet 408 (see FIG. 21 and FIG. 22). The front wall 402, the rear wall 404, and the circumferential side wall 406 are connected one another to provide an airtight chamber inside the impingement box 400 other than the part of the box air inlet 408 and the air holes 79.

Figure 19:
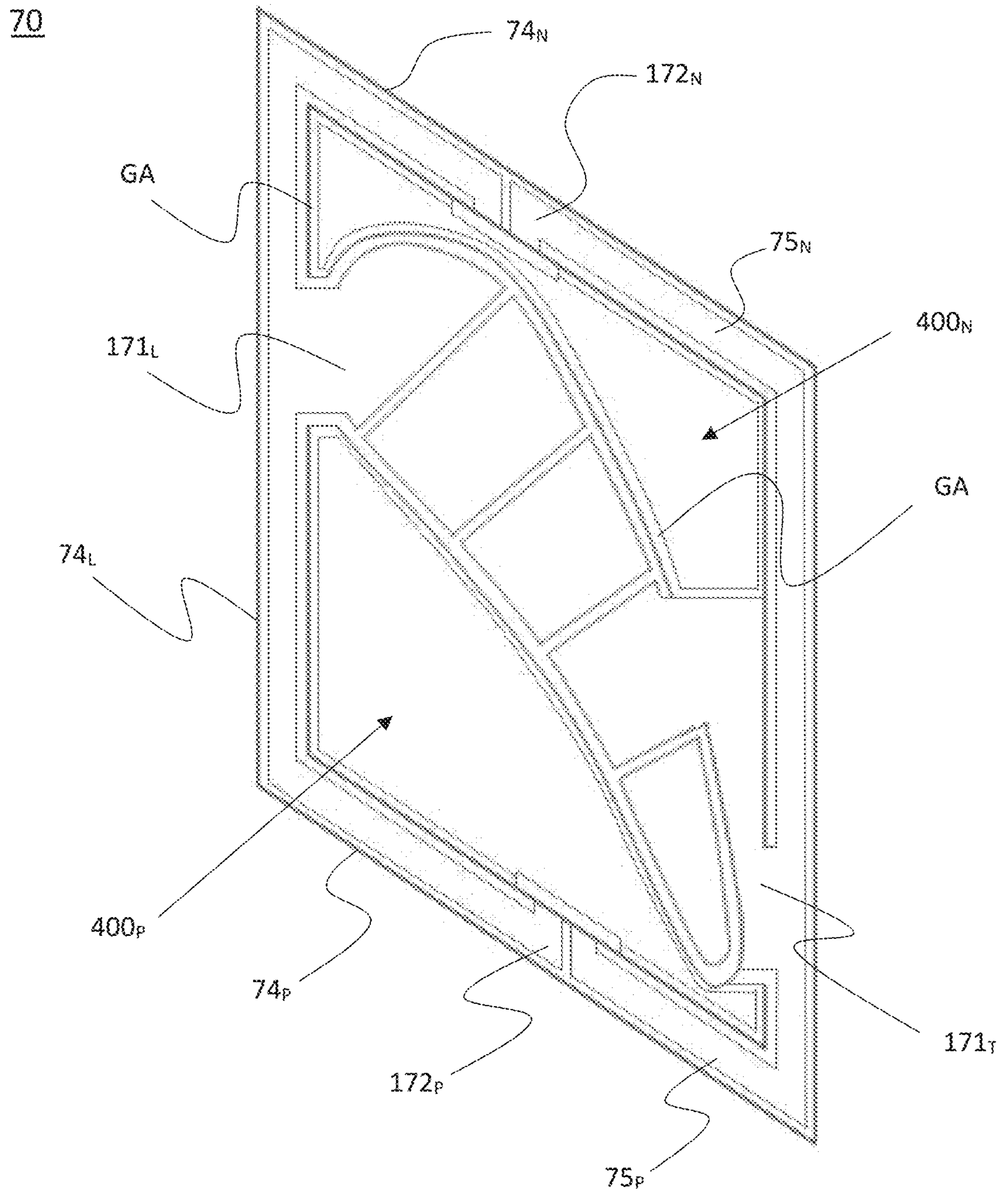
FIG. 19 is a schematic sectional view of a stator vane according to the eighth embodiment.
Figure 20:
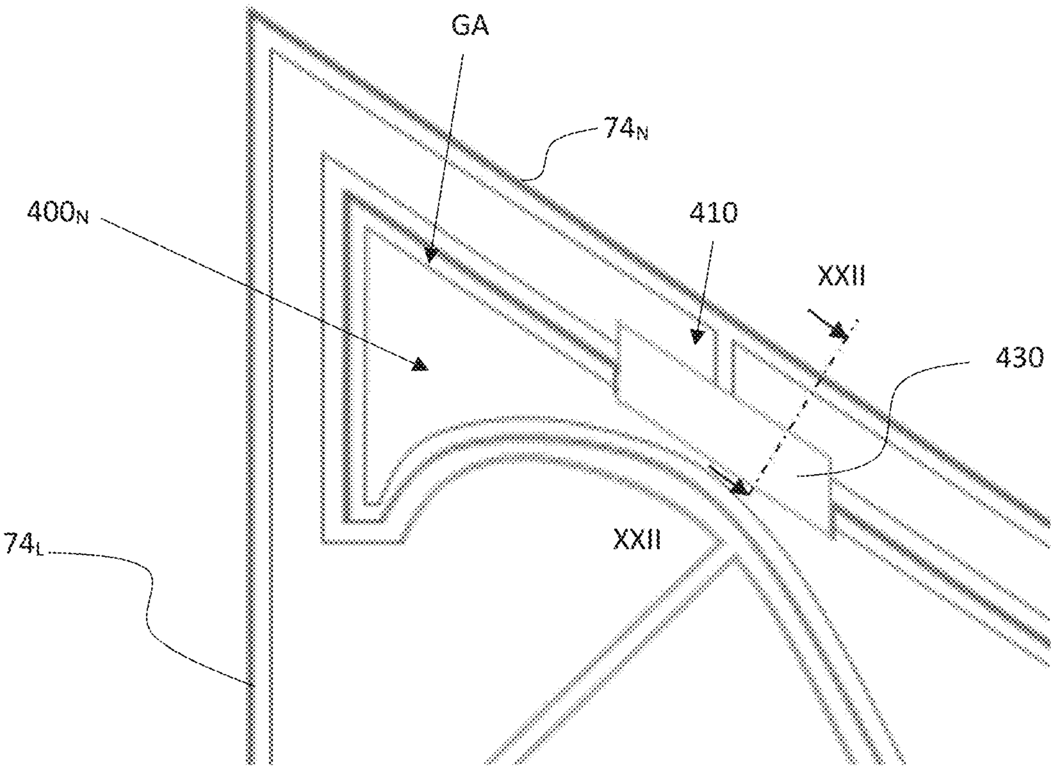
FIG. 20 is a partial enlargement view of FIG. 19.

FIG. 19 is a schematic sectional view of a stator vane according to the eighth embodiment. FIG. 20 is a partial enlargement view of FIG. 19. As shown by FIG. 18, the impingement box 400 includes a fixation part 410 which is fixed to the shroud edge. The impingement box 400 is connected and fixed to the shroud edge 74 only at the fixation part 410. Other part of the impingement box 400 is not connected to the shroud edge 74 nor a side wall of the airfoil 51 such that other part of the impingement box 400 other than the fixation part 410 is separated and spaced apart from the shroud edge 74 and the side wall of the airfoil 51. For example, the circumferential side wall 406 other than at the fixation part 410 is entirely separated and spaced apart from the shroud edge 74 with a gap therebetween. Also, the circumferential side wall 406 is separated and spaced apart from a side wall of the airfoil 51 with a gap therebetween.

As shown by FIG. 19, the outer shroud 70 includes a suction-side impingement box $\mathbf{400}_N$ and a pressure-side impingement box $\mathbf{400}_P$. The suction-side impingement box $\mathbf{400}_N$ is connected to the suction-side shroud edge passage outlet $\mathbf{172}_N$. The pressure-side impingement box $\mathbf{400}_P$ is connected to the pressure-side shroud edge passage outlet $\mathbf{172}_P$. Description is provided by using the suction-side impingement box $\mathbf{400}_N$ as an example. The pressure-side impingement box $\mathbf{400}_P$ has the same structure and description is omitted. FIG. 20 shows the gap GA between the suction-side impingement box $\mathbf{400}_N$ and (i) the suction-side shroud edge $\mathbf{74}_N$, (ii) the leading-side shroud edge $\mathbf{74}_L$, and (iii) the side wall of the airfoil 51, respectively. The gap GA between the suction-side impingement box $\mathbf{400}_N$ and the suction-side shroud edge $\mathbf{74}_N$ is provided on both sides of the fixation part 410. The gap GA is provided to surround the suction-side impingement box $\mathbf{400}_N$. As shown by FIG. 19, the gap GA is also provided between the suction-side impingement box $\mathbf{400}_N$ and the trailing-side shroud edge $\mathbf{74}_T$. Also, the gap GA is provided between the suction-side impingement box $\mathbf{400}_N$ and the shroud edge passage inlet $\mathbf{171}_T$. A cover plate 430 is provided to cover the fixation part 410.

The structure and location of the gap GA is not limited to this embodiment. The fixation part 410 may be moved to other portion of the impingement box 400, for example, to a portion corresponding to other shroud edge such as the leading-side shroud edge $\mathbf{74}_L$. In such a modification, the gap GA is provided to surround the impingement box 400 except for the modified fixation part 410. Also, a plurality of fixation parts may be provided to the impingement box 400 to be fixed to the shroud edge 74 or the airfoil 51. In such a structure, a plurality of gaps are provided between adjacent fixation parts.

Figure 21:
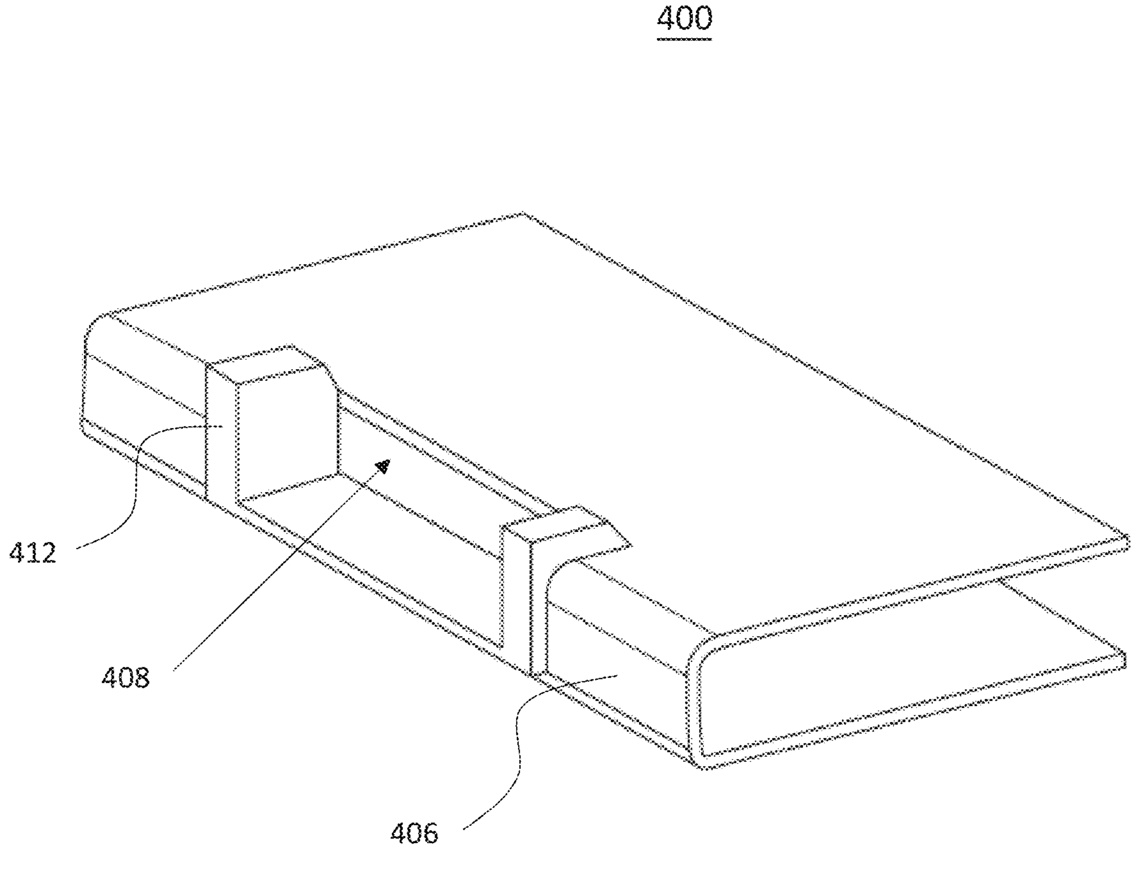
FIG. 21 is a partial enlargement view of the impingement box.

FIG. 21 is a partial enlargement view of the impingement box. FIG. 21 describes a portion of the impingement box 400 around the fixation part 410. The impingement box 400 includes a box air inlet 408. The impingement box 400 also includes an attachment 412 which has a U shape which surrounds the box air inlet 408. The attachment 412 protrudes out from the circumferential side wall 406.

Figure 22:
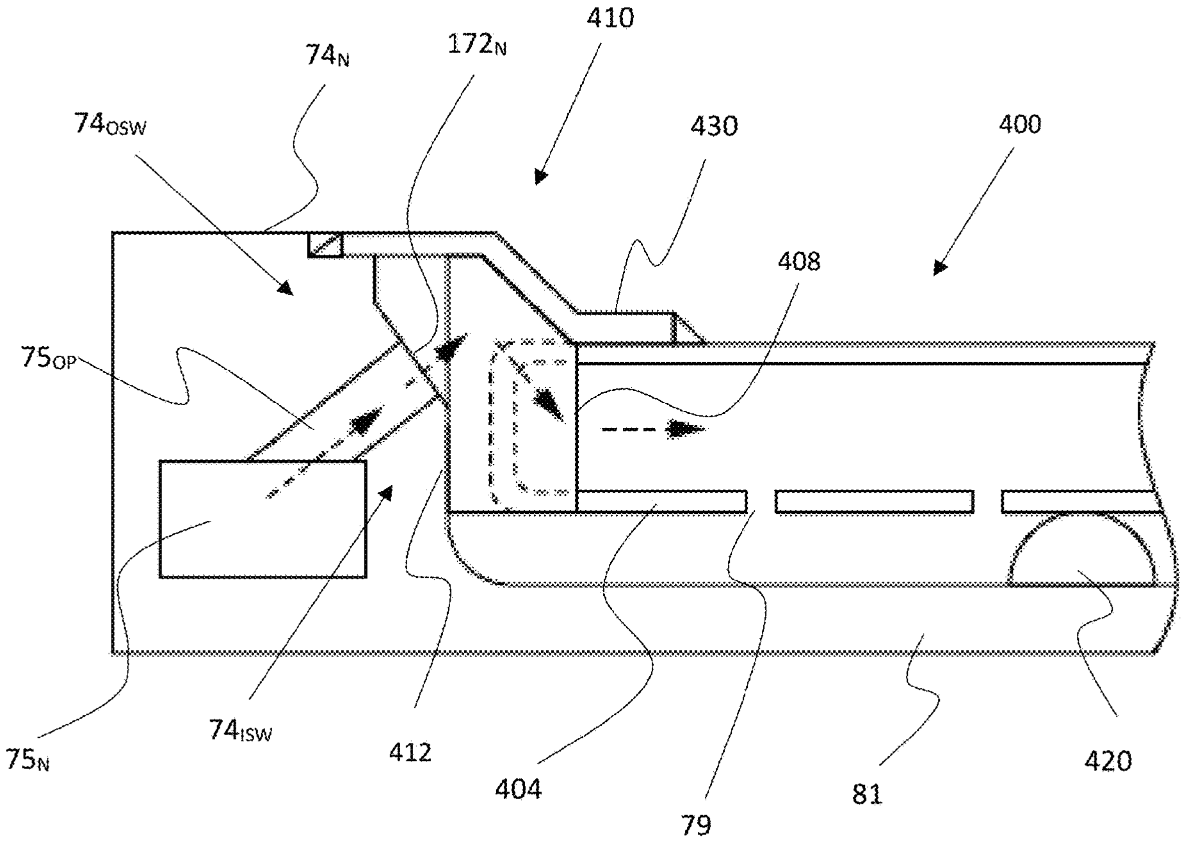
FIG. 22 is a sectional view taken along the line XXII-XXII of FIG. 20.

FIG. 22 is a sectional view taken along the line XXII-XXII of FIG. 20. As shown by FIG. 22, the end face of the attachment 412 abuts an inner side surface of the suction-side shroud edge $\mathbf{74}_N$. The attachment 412 is attached to and fixed to the inner side surface of the suction-side shroud edge $\mathbf{74}_N$ by, for example, welding. The connection of the impingement box 400 to the shroud edge 74 is limited to the connection between the attachment 412 and the suction-side shroud edge $\mathbf{74}_N$. By this structure, the impingement box 400 is cantilevered by this connection. A spacer 420 is disposed on an outer surface of the radially inner wall 81 to provide support to the rear wall 404 of the impingement box 400 which facilitates positioning of the impingement box 400 and having space between the radially inner wall 81 of the shroud main body 72 and the rear wall 404. A plurality of the spacer 420 may be provided to the radially inner wall 81.

As shown by FIG. 22, the box air inlet 408 is communicated with the suction-side shroud edge passage outlet $\mathbf{172}_N$ such that the cooling air flowing inside the suction-side shroud edge passage $\mathbf{75}_N$ flows out from the suction-side shroud edge passage outlet $\mathbf{172}_N$ to the box air inlet 408.

Figure 23A:
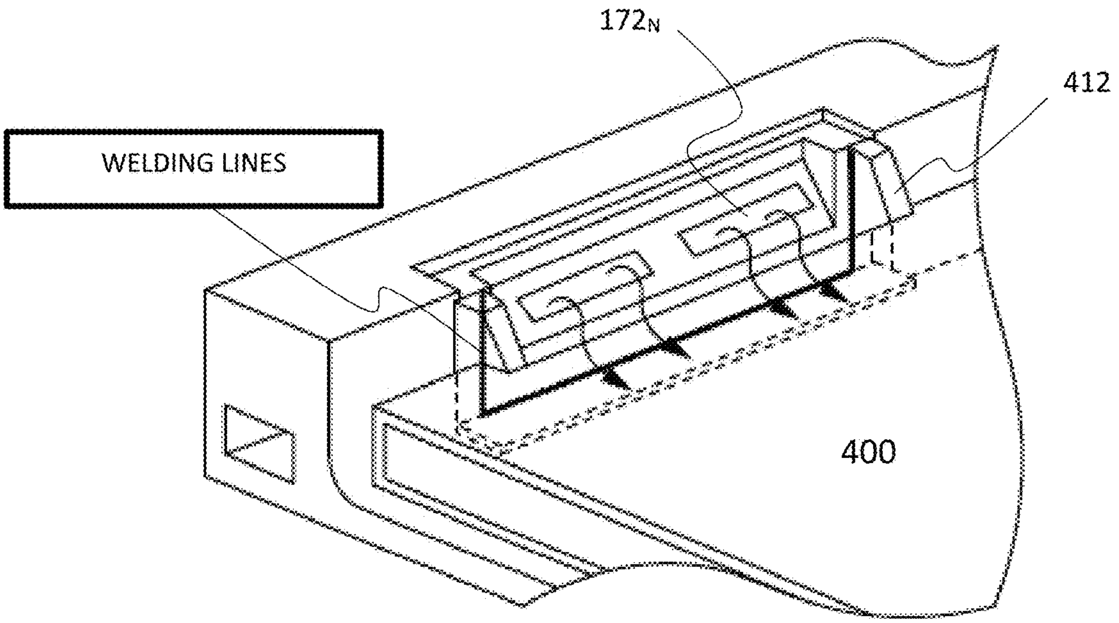
FIGS. 23A and 23B are respectively a schematic sectional view of a stator vane according to the eighth embodiment.
Figure 23B:
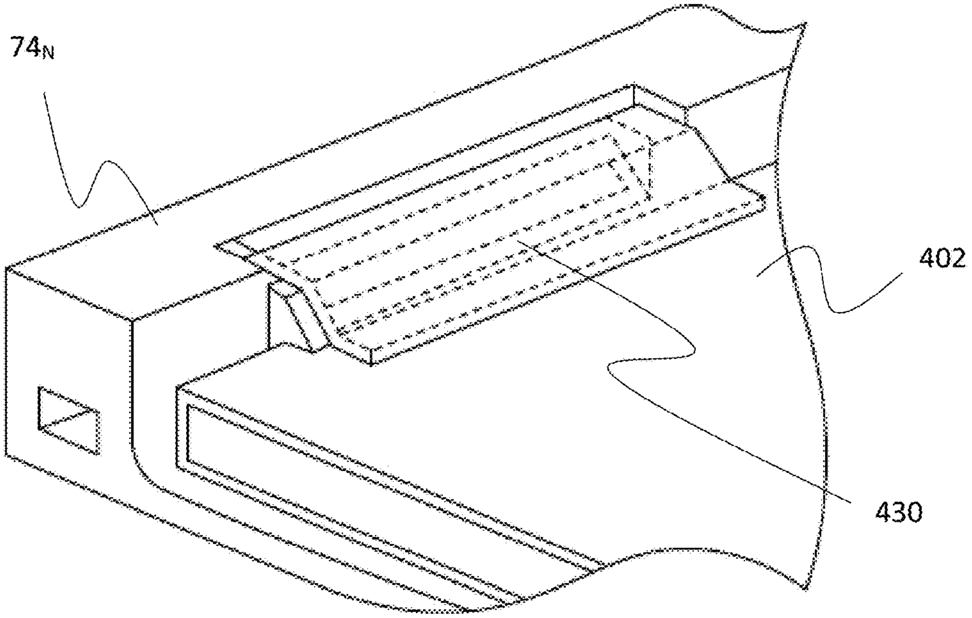

FIGS. 23A and 23B are respectively a schematic sectional view of a stator vane according to the eighth embodiment. As shown by FIG. 23A, after the end face of the attachment 412 is attached to and fixed to the inner side surface of the suction-side shroud edge $\mathbf{74}_N$ by, for example welding, the suction-side shroud edge passage outlet $\mathbf{172}_N$ is open. Thus, as shown by FIG. 23B, the cover plate 430 is applied to the connection area between the suction-side shroud edge passage outlet $\mathbf{172}_N$ and the box air inlet 408 to provide air tight structure or chamber or passage extending between the suction-side shroud edge passage outlet $\mathbf{172}_N$ and the box air inlet 408. The cover plate 430 is attached to the shroud edge $\mathbf{74}_N$, a surface of the attachment 412 (top and slope surface), and a surface of the front wall 402 by, for example, welding.

Figure 24:
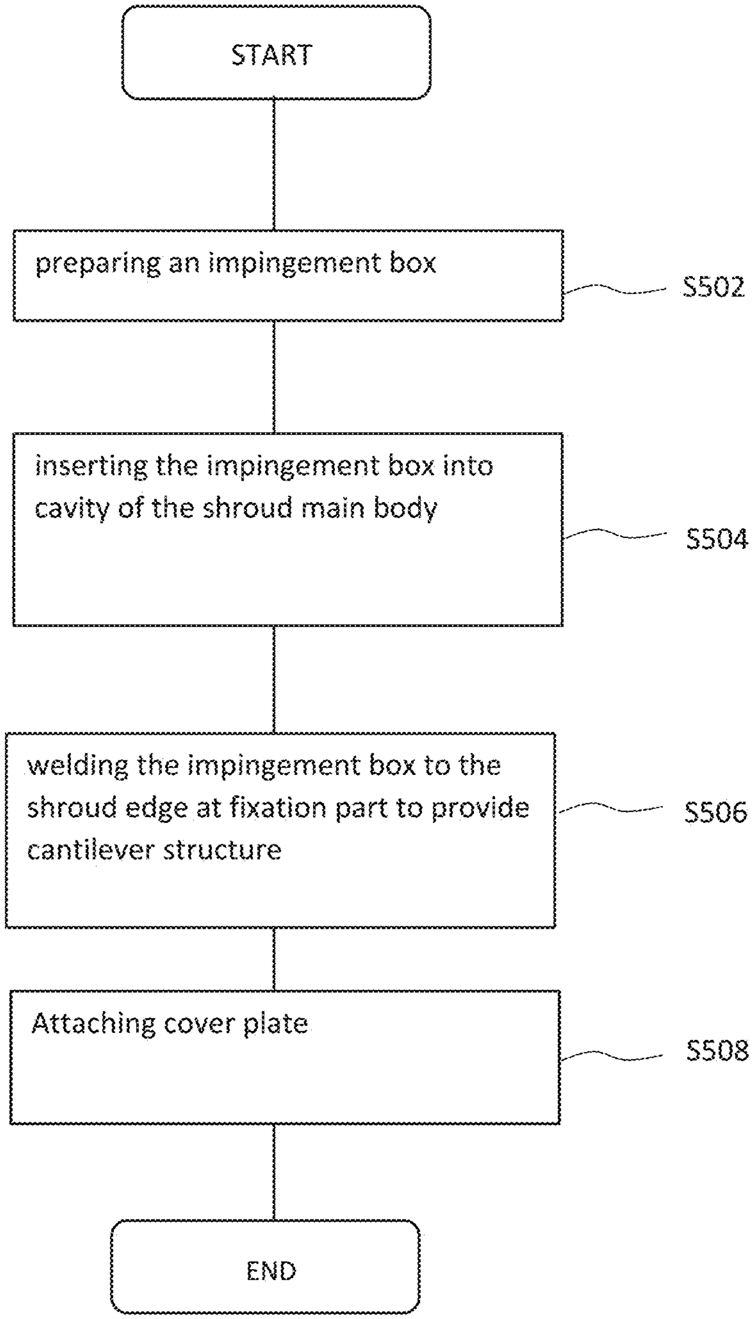
FIG. 24 is a flowchart illustrating a manufacturing method of a shroud of a vane of a turbine.

Next, a manufacturing method of a shroud of a vane of a turbine is described. FIG. 24 is a flowchart illustrating a manufacturing method of a shroud of a vane of a turbine. As shown by FIG. 24, at a step S502, the impingement box 400 is prepared. Then, at a step S504, the impingement box 400 is inserted into the cavity CA of the shroud main body 72 such that the rear wall 404 faces the radially outer surface of the radially inner wall 81. Then, at a step S506, the impingement box 400 is welded to the shroud edge 74 at the fixation part 410 while other portions of the impingement box 400 are spaced apart from the shroud edge 74 and the side wall of the airfoil 51 to provide cantilever structure such that the gap GA is provided to surround the impingement box 400 other than the fixation part 410. More specifically, the attachment 412 is welded to the suction-side shroud edge $\mathbf{74}_N$. In these steps, the spacer 420 may provide support to the rear wall 404. Then, at a step S508, the cover plate 430 is applied to cover the passage from the suction-side shroud edge passage outlet $\mathbf{172}_N$ to the box air inlet 408.

Figure 25:
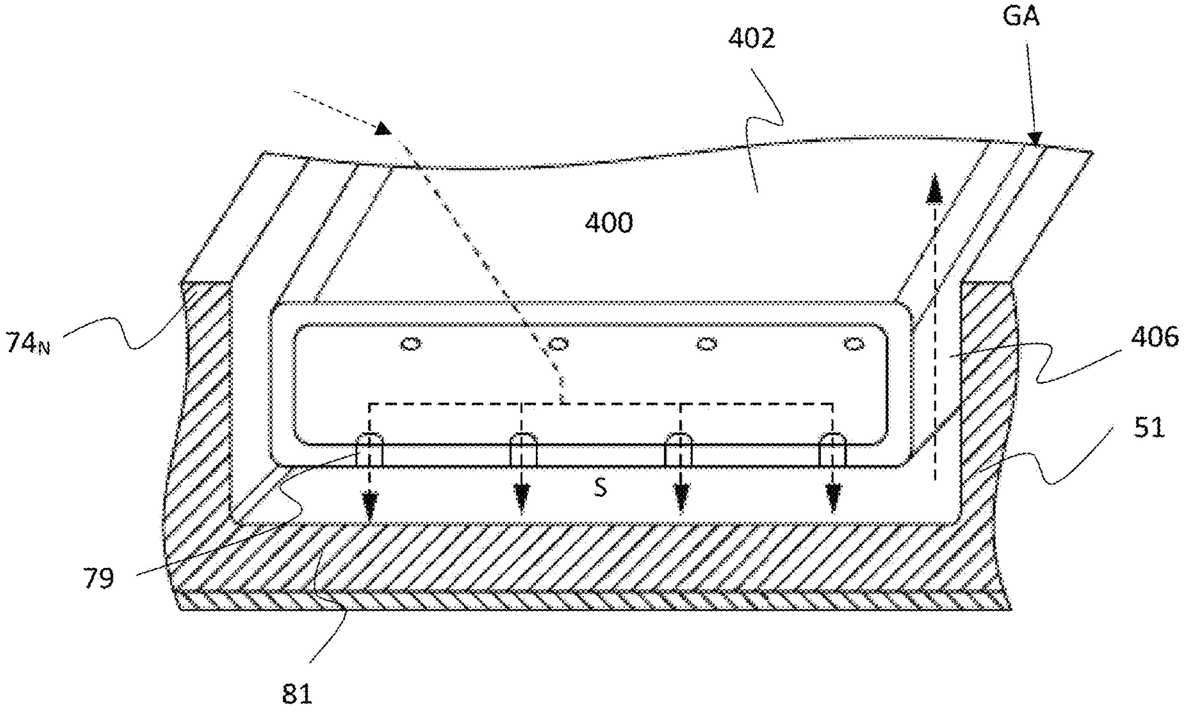
FIG. 25 is a schematic sectional view of a stator vane according to the eighth embodiment.

FIG. 25 is a schematic sectional view of a stator vane according to the eighth embodiment. FIG. 25 describes the air flow of the cooling air from the suction-side shroud edge passage outlet $\mathbf{172}_N$ into the impingement box 400 and to outside of the impingement box 400. As shown by FIG. 25, the cooling air flowing inside the suction-side shroud edge passage $\mathbf{75}_N$ flows out from the suction-side shroud edge passage outlet $\mathbf{172}_N$ into the impingement box 400 through the box air inlet 408. Then, the cooling air is jetted from the air holes 79 toward a radially outer surface of the radially inner wall 81 for impingement cooling of the radially outer surface of the radially inner wall 81, and then, is ejected through the gap GA to outside, then returned to the inside of the combustor casing. The gap GA connects the inner region (cavity) of the hollow space(S) and an outside space located on the opposite side of the front wall 402 with respect to the hollow space (S). In FIG. 25, the gap GA is indicated at location, for example, between the circumferential side wall 406 and the side wall of the airfoil 51.

According to this embodiment, the inner region and the outer region of the space S of the shroud main body 72 is formed by inserting the impingement box 400 into the cavity of the shroud main box 72 and welding the impingement box 400 at the fixation part. Thus, it is possible to easily provide a shroud with a cooling structure with effectively sealed chamber by supporting the impingement box by the shroud edge. Moreover, after the impingement cooling of the radially inner wall 81, the cooling air is ejected and collected through the gap GA. Thus, it is possible to remove necessity to provide a separate structure (path) to eject and collect the cooling air after impingement cooling.

According to the study by inventors, during the operation of the turbine, temperature difference may occur between the shroud edge 74 and the impingement box 400, which may generate thermal stress at the connection part therebetween. According to this embodiment, the impingement box 400 is supported by the cantilever structure and the gap GA surrounds the impingement box 400, and thus, the gap GA may absorb effect of thermal expansion to reduce thermal stress.

Figure 26:
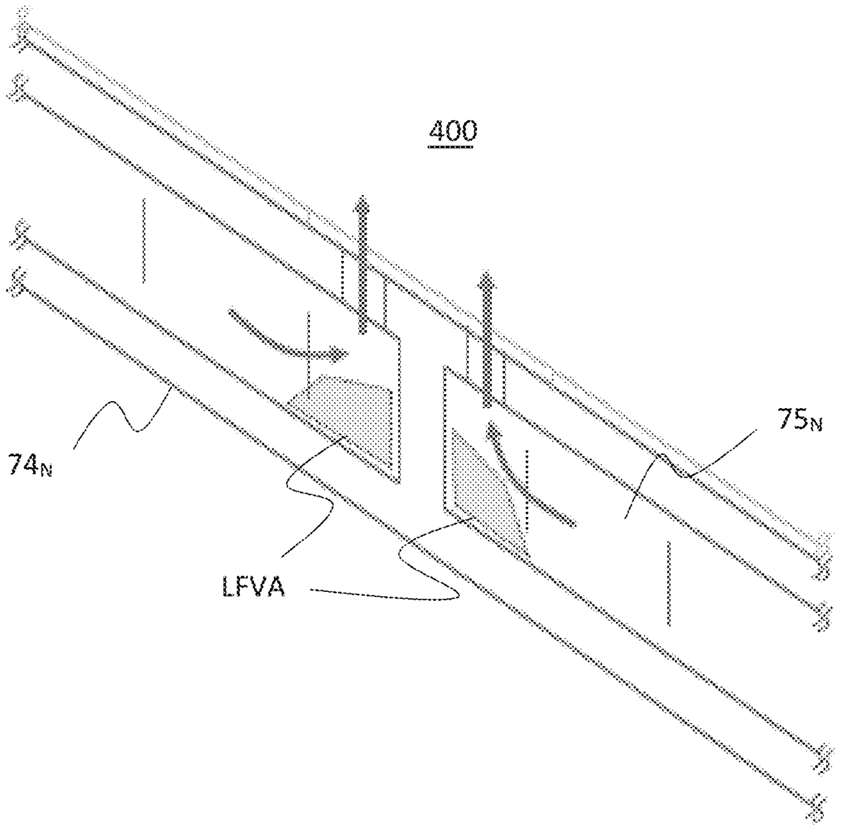
FIG. 26 is a schematic transverse sectional view of a stator vane describing principle of the eighth embodiment.

FIG. 26 is a schematic transverse sectional view of a stator vane describing principle of the eighth embodiment. As shown by FIG. 26, the shroud edge passage $\mathbf{75}_N$ is communicated with the inside of the impingement box 400. In a case when the outlet of the shroud edge passage is disposed in the portion of the shroud edge passage $\mathbf{75}_N$ facing to the impingement box 400, Low Flow Velocity Area (LFVA) in which a flow velocity of the cooling air inside the shroud edge passage $\mathbf{75}_N$ is decreased is caused by the flow of the cooling air toward the direction of impingement box 400. In this embodiment, as shown by FIG. 22, the suction-side shroud edge $\mathbf{74}_N$ includes a shroud edge outlet passage $\mathbf{750}_P$ which diagonally extends and connects the suction-side shroud edge passage $\mathbf{75}_N$ to the suction-side passage outlet $\mathbf{172}_N$. More specifically, the suction-side shroud edge $\mathbf{74}_N$ includes an opposite side wall $\mathbf{74}_{OSW}$ located on a side of the shroud edge $\mathbf{74}_N$ which is opposite to a side of the shroud edge $\mathbf{74}_N$ facing the hot gas passage of the turbine (this side is indicated by the reference 81 in FIG. 22), and an inner side wall $\mathbf{74}_{ISW}$ facing the impingement box 400. The opposite side wall $\mathbf{74}_{OSW}$ and the inner side wall $\mathbf{74}_{ISW}$ define the shroud edge passage $\mathbf{75}_N$ inside thereof.

The shroud edge outlet passage 750$_P$ has an inlet end connected to the suction-side shroud edge passage 75$_N$ and an outlet end connected to the suction-side passage outlet 172$_N$. The shroud edge outlet passage 75$_{OP}$ is disposed in the opposite side wall 74$_{OSW}$. More specifically, the inlet end of the shroud edge outlet passage 750$_P$ is disposed in the radially opposite side wall 74$_{OSW}$. Here, the inlet end of the shroud edge outlet passage 750$_P$ is disposed in the vicinity of the possible low flow velocity area LFVA such that the shroud edge outlet passage 750$_P$ is communicated with the possible low flow velocity area LFVA.

By this structure in which the inlet end of the shroud edge outlet passage 75$_{OP}$ is disposed in the vicinity of the possible low flow velocity area LFVA, it is possible to decrease formation of the possible low flow velocity area LFVA in the shroud edge passage.

The structure of the stator vane is not limited to this embodiment. For example, the outlet end of the shroud edge outlet passage 75$_{OP}$ may be disposed in the inner side wall 74$_{ISW}$.

Figure 27:
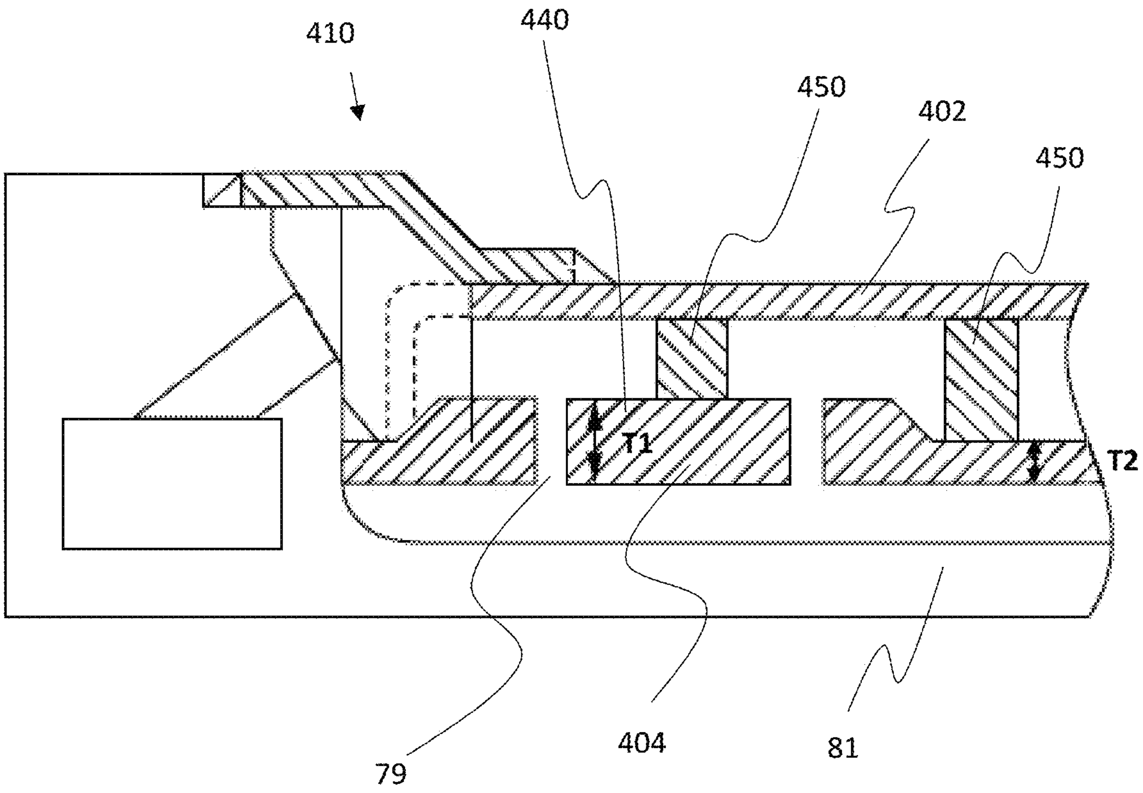
FIG. 27 is a schematic sectional view according to the ninth embodiment.
Figure 28:
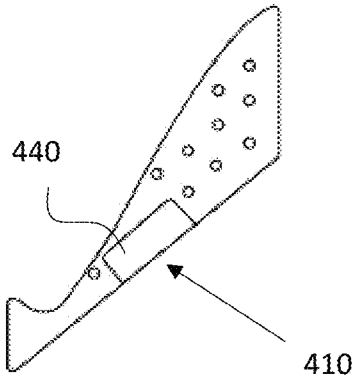
FIG. 28 is a schematic bottom view according to the ninth embodiment.

Next, the ninth embodiment is described. FIG. 27 is a schematic sectional view according to the ninth embodiment. FIG. 27 describes a portion of the shroud corresponding to FIG. 22. FIG. 28 is a schematic bottom view according to the ninth embodiment. FIG. 28 schematically describes a bottom view of the rear wall 404 of the impingement box 400. As shown by FIG. 27, the impingement box 400 includes a rear wall 404 facing the cooling face of the radially inner wall 81. As shown by FIG. 27 and FIG. 28, the rear wall 404 includes a thicker portion 440 in the vicinity of the fixation part 410. The thicker portion 440 has a thickness T1 which is larger than thickness T2 of other part of the rear wall 404. By this structure of having the thicker portion 440, it is possible to suppress thermal deformation and thermal stress at the fixation part 410 to prevent Low Cycle Fatigue.

The thicker portion 440 of the rear wall 404 includes the air holes 79. The air holes 79 provided in the thicker portion 440 may have a diameter larger than the diameter of the air holes 79 provided to other part of the rear wall 404. For example, the diameter of the air holes 79 may be preset such that the ratio R between the thickness T: the diameter D is constant.

As shown by FIG. 27, the impingement box 400 includes a support structure 450, for example, a support pin inside thereof. The impingement box 400 has a hollow chamber between the front wall 402 and the rear wall 404. The support pin 450 is a column shaped structure fixed to the front wall 402 at one end thereof and fixed to the rear wall 404 at an opposite end thereof. A plurality of the support pin 450 may be provided inside the impingement box 400 and the plurality of the support pin 450 may be disposed with a regular pitch.

According to the study by inventors, during the operation of the turbine, pressure difference may occur between the inside and the outside of the impingement box 400 which may cause bulging of the impingement box 400. By providing the support pin 45 which connects and holds the front wall 402 with the rear wall 404, bulging of the impingement box 400 which separates the front wall 402 from the rear wall 404 may be suppressed.

Figure 29:
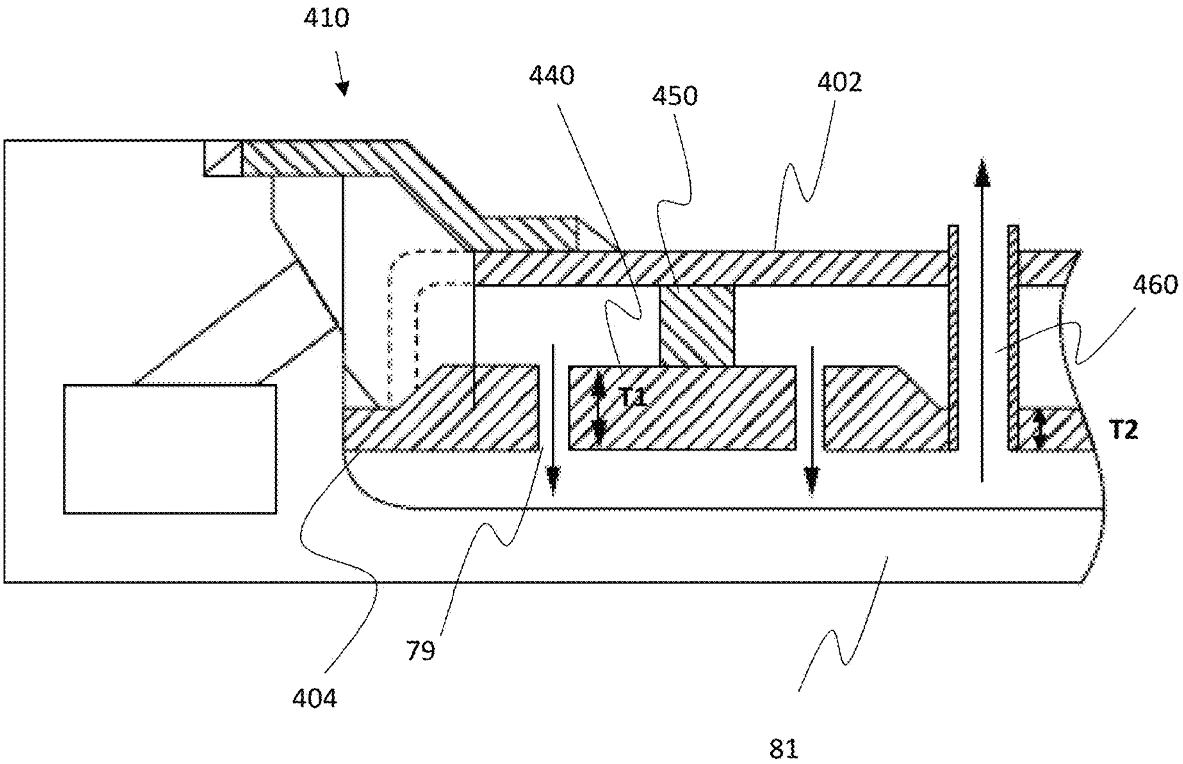
FIG. 29 is a schematic sectional view of modification of the ninth embodiment.

The structure of the stator vane is not limited to this embodiment. For example, FIG. 29 is a schematic sectional view of modification of the ninth embodiment. In this embodiment, the impingement box 400 includes a support structure 460 which also functions similar to the exit conduit 83. The support pin 460 is a column shaped structure fixed to the front wall 402 at one end thereof and fixed to the rear wall 404 at an opposite end thereof. The support pin 460 also includes a hollow passage inside thereof and penetrates through the front wall 402 and the impingement plate (rear wall 404) to connect the inner region and the outside space to collect and eject the cooling air after impingement cooling.

The above embodiments are described by using as an example the outer shroud 70. However, the embodiments may be applied to the inner shroud 60 in similar manner. The present disclosure is not limited to the above-described embodiment and can be implemented in various embodiments. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

10 gas turbine
20 turbine
22 turbine casing
24 rotor shaft
26 turbine rotor
Ar Axis
30 combustor
50 stator vane
51 vane body (airfoil)
51$_P$ partition walls
52 leading edge
53 trailing edge
54 suction-side surface
55 pressure-side surface
56 intake manifold
57 outer air channel
58 air inlet
59 apertures
141, 142, 143 air channel
151, 152, 153 insert
161, 162, 163 inner air channel
191, 192, 193, 194, 195 air channel
154 airfoil cooling structure
164 pin fins
60 inner shroud
70 outer shroud
62, 72 shroud main body
63, 73 impingement plate
64, 74 shroud edge
65, 75 shroud edge passage
S hollow space
171 shroud edge passage inlet
172 shroud edge passage outlet
175 turbulator
76 peripheral wall
78 gas path surface
79 air holes
81 radially inner wall
82 radially outer wall
83 exit conduit
181 shroud edge passage inlet
182 shroud edge passage outlet
300, 400 impingement box
302, 402 front wall
304, 404 rear wall 306, 406 circumferential side wall
308, 408 box air inlet
320, 420 spacer
410 fixation part
412 attachment
430 cover plate
440 thicker portion
450, 460 support pin

What is claimed is:

1. A shroud of a vane of a turbine comprising:

a shroud main body comprising a first wall having a gas-passage face facing a hot gas passage of the turbine and a cooling face facing opposite to the hot gas passage;

a shroud edge disposed on a circumference of the shroud main body to surround the shroud main body, the shroud edge comprising a shroud edge passage therein; and an impingement box disposed to face the cooling face of the first wall so as to be spaced apart from the cooling face of the first wall, wherein the impingement box comprises:

a cooling air inlet to introduce a cooling air from the shroud edge passage into an inside of the impingement box;

an impingement air hole configured to jet the introduced cooling air to the cooling face of the first wall to cool the cooling face of the first wall; and a path that guides the cooling air jetted onto the cooling face of the first wall to an outside space located on an opposite side of the first wall as viewed from the impingement box.

2. The shroud of the vane of the turbine according to claim 1, wherein a circumference of the impingement box includes a fixation part fixed to the shroud edge.

3. The shroud of the vane of the turbine according to claim 1, wherein the shroud comprises a cooling air collecting passage configured to collect the cooling air which has been jetted to cool the cooling face of the first wall.

4. The shroud of the vane of the turbine according to claim 2, wherein the circumference of the impingement box includes a no-fixation part having a gap between the shroud edge and the circumference of impingement box.

5. The shroud of the vane of the turbine according to claim 4, wherein the shroud comprises a cooling air collecting passage configured to collect the cooling air which has been jetted to cool the cooling face of the first wall, and the gap constitutes the cooling air collecting passage.

6. The shroud of the vane of the turbine according to claim 5, wherein the gap is communicated with a space between the impingement box and the cooling face of the first wall.

7. The shroud of the vane of the turbine according to claim 2, wherein the impingement box is cantilevered by the fixation part fixed to the shroud edge.

8. The shroud of the vane of the turbine according to claim 1, wherein the shroud main body comprises a cavity outlined by the first wall and the shroud edge, and the impingement box is inserted into the cavity and partially fixed to the shroud edge.

9. A shroud of a vane of a turbine comprising:

a shroud main body having a substantially parallelogram shape, the shroud main body comprising a first wall having a gas-passage face facing a hot gas passage of the turbine and a cooling face facing opposite to the hot gas passage;

a shroud edge disposed on a circumference of the shroud main body to surround the shroud main body, the shroud edge comprising a shroud edge passage therein; and an impingement box disposed to face the cooling face of the first wall so as to be spaced apart from the cooling face of the first wall, wherein the shroud edge passage is provided along a side of the parallelogram, and the impingement box comprises:

a cooling air inlet to introduce a cooling air from the shroud edge passage into an inside of the impingement box; and an impingement air hole configured to jet the introduced cooling air to the cooling face of the first wall to cool the cooling face of the first wall.

10. The shroud of the vane of the turbine according to claim 9, wherein the shroud main body comprises a cavity outlined by the first wall and the shroud edge, and the impingement box is inserted into the cavity, wherein the shroud edge comprises:

an opposite side wall located on a side of the shroud edge opposite to a side of the shroud edge facing the hot gas passage of the turbine, an inner side wall facing the impingement box, the opposite side wall and the inner sidewall defining the shroud edge passage, and a shroud edge outlet passage configured to connect the shroud edge passage to the cooling air inlet of the impingement box to introduce the cooling air flowing inside the shroud edge passage into the cooling air inlet of the impingement box, and wherein the shroud edge outlet passage is disposed in the opposite side wall of the shroud edge.

11. The shroud of the vane of the turbine according to claim 9, wherein the shroud edge outlet passage includes an inlet end connected to the shroud edge passage, and the inlet end of the shroud edge outlet passage is disposed in the opposite side wall of the shroud edge.

12. The shroud of the vane of the turbine according to claim 9, wherein the fixation part includes an attachment configured to protrude from a side surface of the impingement box, the attachment being securely fastened to the shroud edge.

13. The shroud of the vane of the turbine according to claim 9, wherein the attachment is configured to surround the cooling air inlet.

14. The shroud of the vane of the turbine according to claim 9, wherein the impingement box includes a cover disposed over an opening of the cooling air inlet.

15. The shroud of the vane of the turbine according to claim 9, wherein the shroud edge passage is provided along two adjacent sides of the parallelogram.

16. A vane of a turbine comprising:

an airfoil extending in a radial direction of the turbine; and a shroud disposed on a radially inner side or a radially outer side of the airfoil, wherein the shroud comprises:

a shroud main body comprising a first wall having a gas-passage face facing a hot gas passage of the turbine and a cooling face facing opposite to the hot gas passage;

a shroud edge disposed on a circumference of the shroud main body to surround the shroud main body, the shroud edge comprising a shroud edge passage therein; and an impingement box disposed to face the cooling face of the first wall so as to be spaced apart from the cooling face of the first wall, and the impingement box comprises:

a cooling air inlet to introduce a cooling air from the shroud edge passage into an inside of the impingement box; and an impingement air hole configured to jet the introduced cooling air to the cooling face of the first wall to cool the cooling face of the first wall.

* * * * *